United States Patent
Sensui

(10) Patent No.: US 6,359,739 B1
(45) Date of Patent: Mar. 19, 2002

(54) MACRO LENS SYSTEM

(75) Inventor: Takayuki Sensui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/608,009

(22) Filed: Jun. 30, 2000

(30) Foreign Application Priority Data

Jul. 2, 1999 (JP) ............................................ 11-189213

(51) Int. Cl.⁷ .............................. G02B 9/00; G02B 9/34
(52) U.S. Cl. ....................................... 359/754; 359/773
(58) Field of Search ................................ 359/771–773, 359/763–764, 766, 754–757, 686, 684, 676, 693

(56) References Cited

U.S. PATENT DOCUMENTS

| | | | | |
|---|---|---|---|---|
| 5,194,991 A | * | 3/1993 | Yamanashi | 359/693 |
| 5,325,233 A | * | 6/1994 | Nakatsuji et al. | 359/684 |
| 5,402,268 A |   | 3/1995 | Tatsuno | 359/747 |
| 5,623,371 A | * | 4/1997 | Hankawa | 359/693 |
| 6,246,833 B1 | * | 6/2001 | Harada | 396/79 |

FOREIGN PATENT DOCUMENTS

JP 9-211319 8/1997

* cited by examiner

Primary Examiner—Jordan M. Schwartz
(74) Attorney, Agent, or Firm—Greenblum & Bernstein, P.L.C.

(57) ABSTRACT

A macro lens system which includes a positive first lens group, a negative second lens group, a positive third lens group, and a negative fourth lens group, in this order from the object. Upon focusing from an infinite photographing distance to the closest photographing distance, the second lens group moves towards the image, and the third lens group moves toward the object. The macro lens system satisfies the following condition:

$$3.7 < |f \times m / \Delta X3| < 9.9 \tag{1}$$

wherein f designates the focal length of the entire lens system at an infinite photographing distance;

m designates the transverse magnification at the closest photographing distance; and $\Delta X3$ designates the traveling distance of the third lens group from the infinite photographing distance to the closest photographing distance.

4 Claims, 27 Drawing Sheets

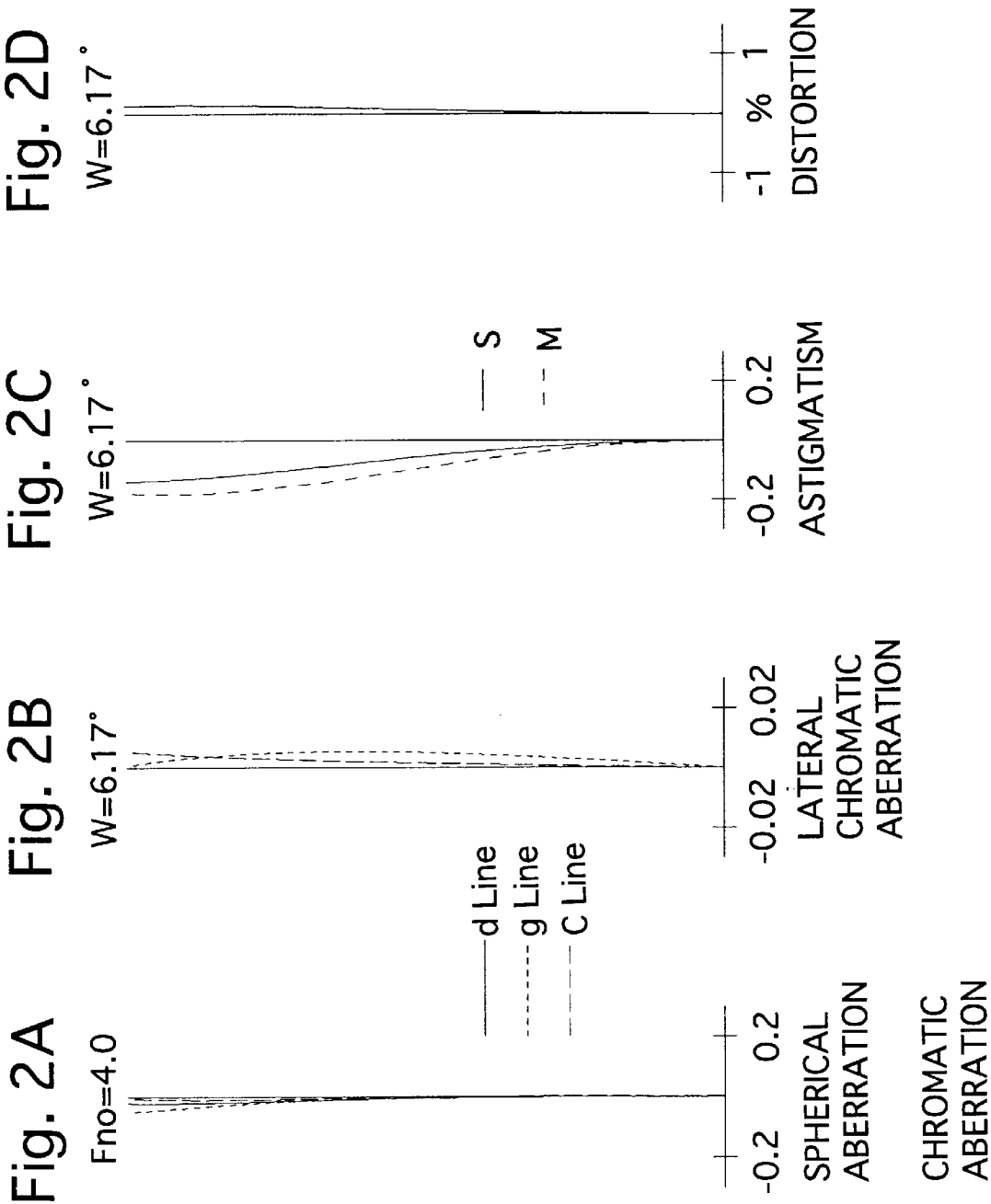

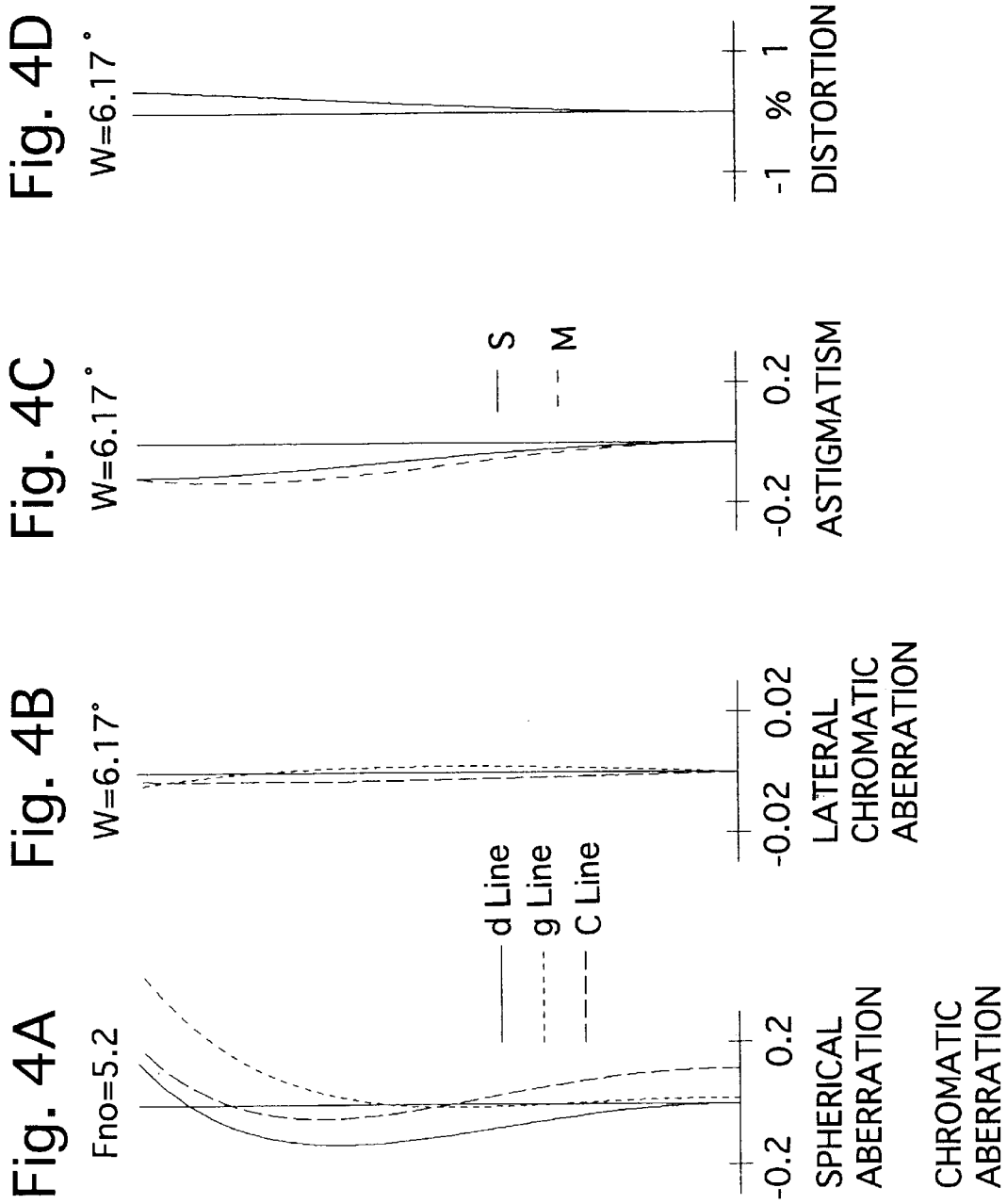

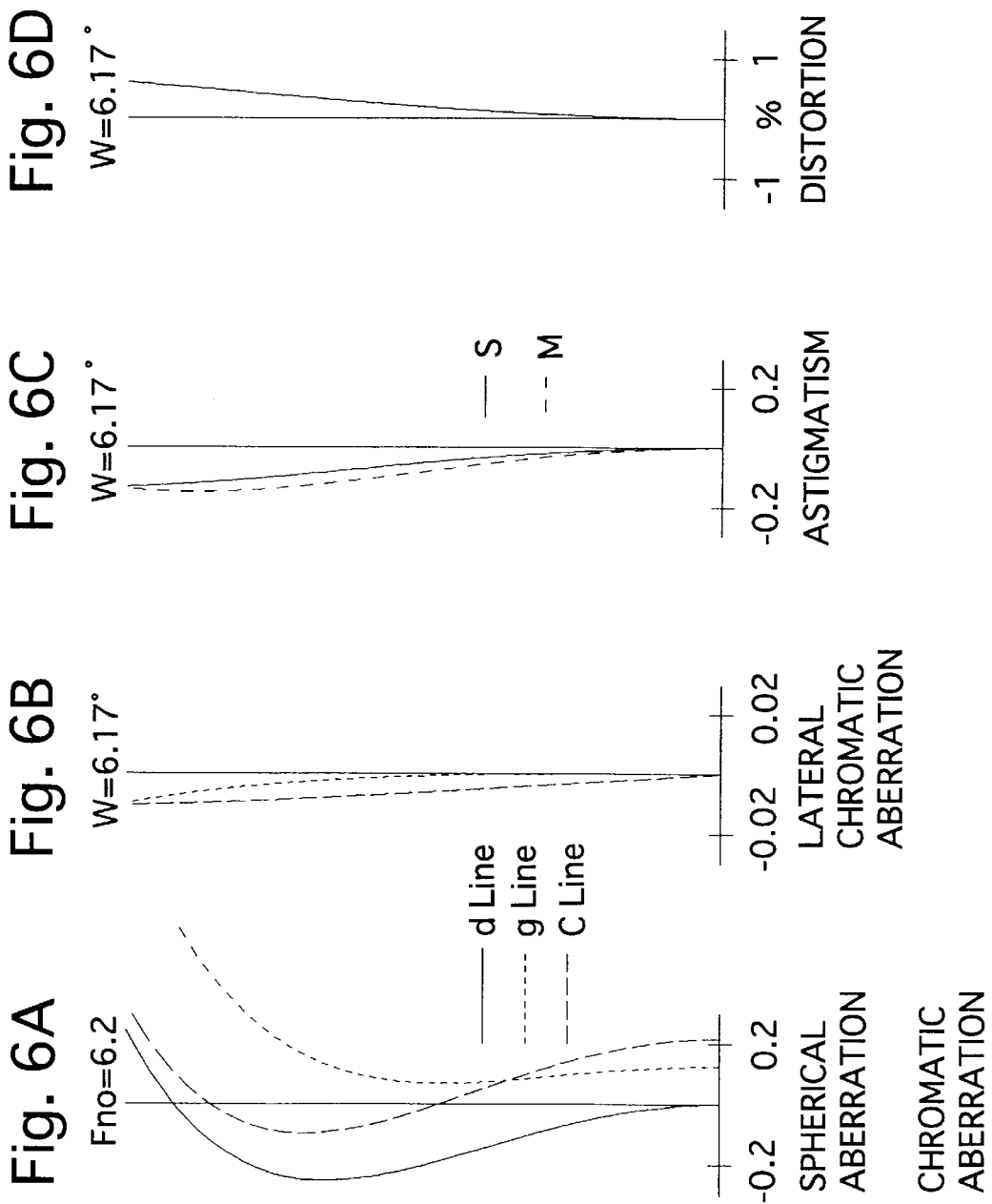

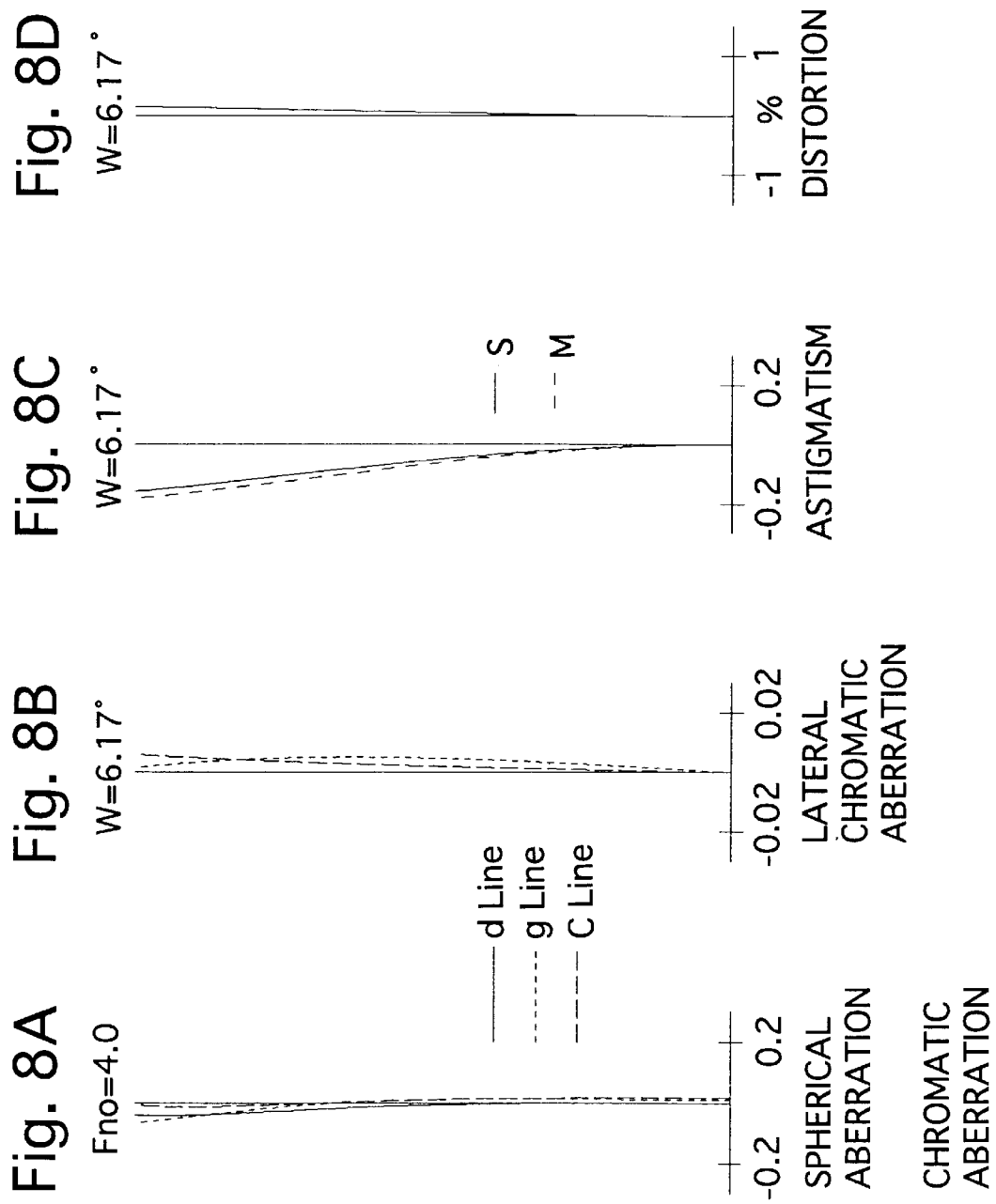

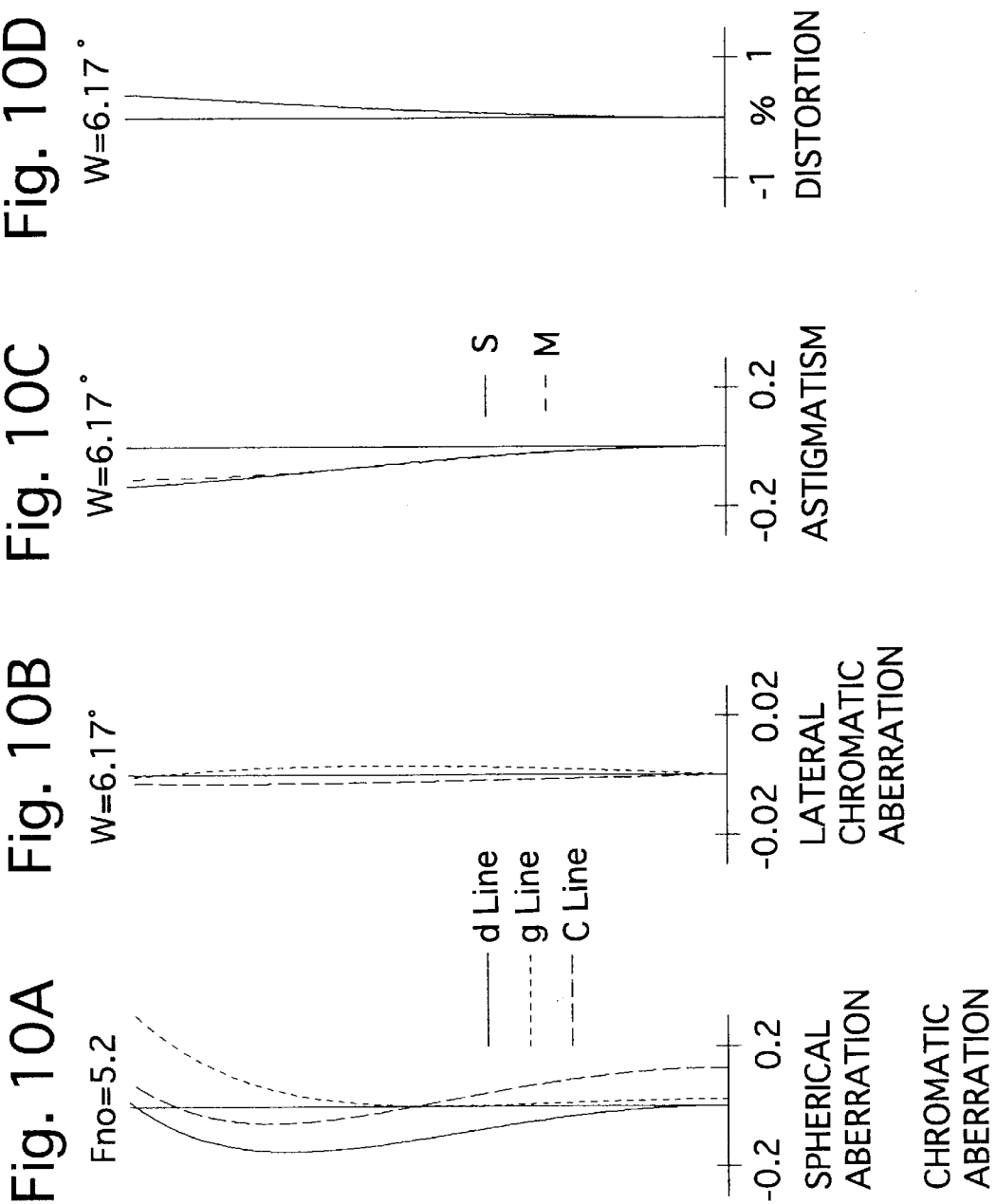

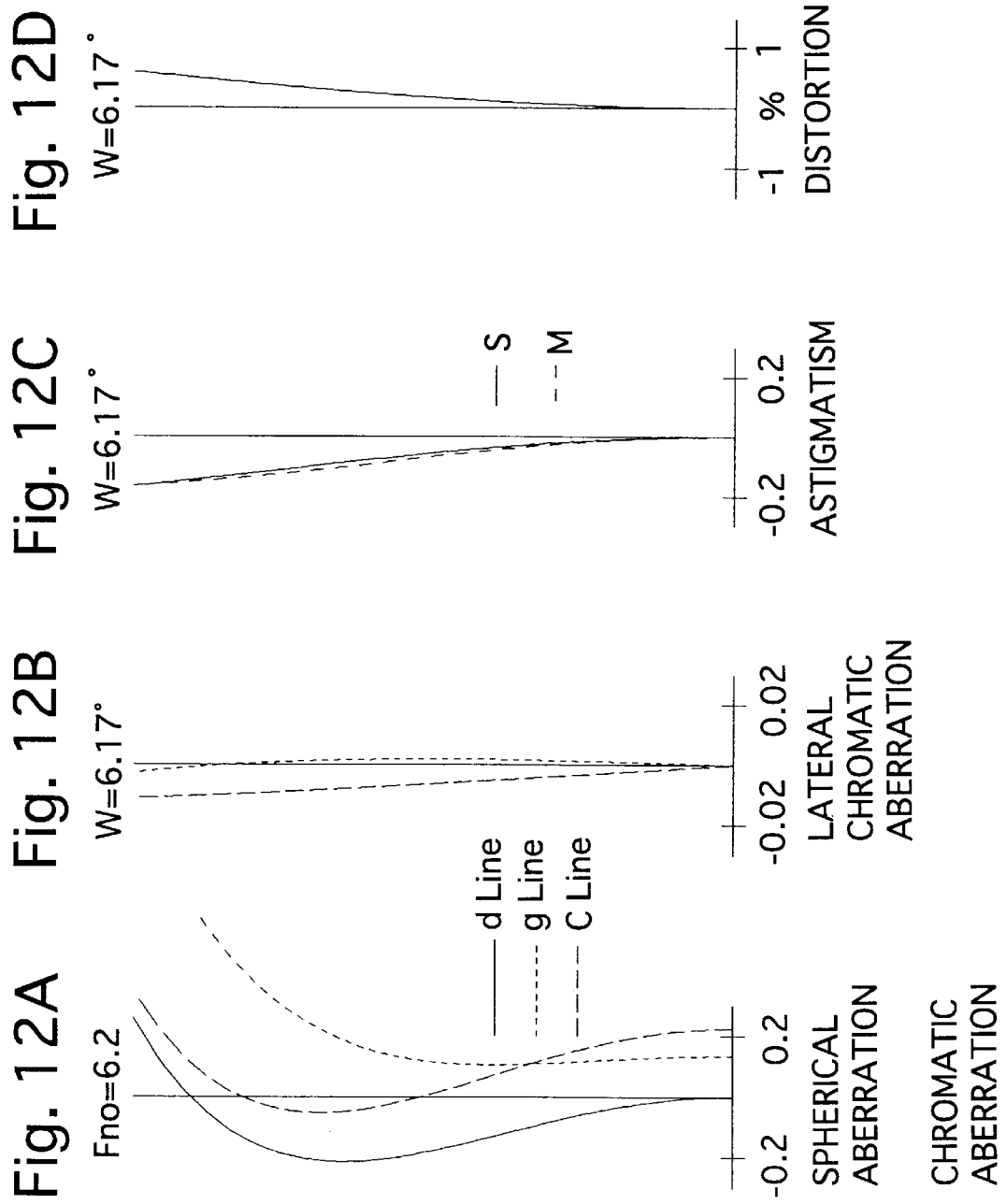

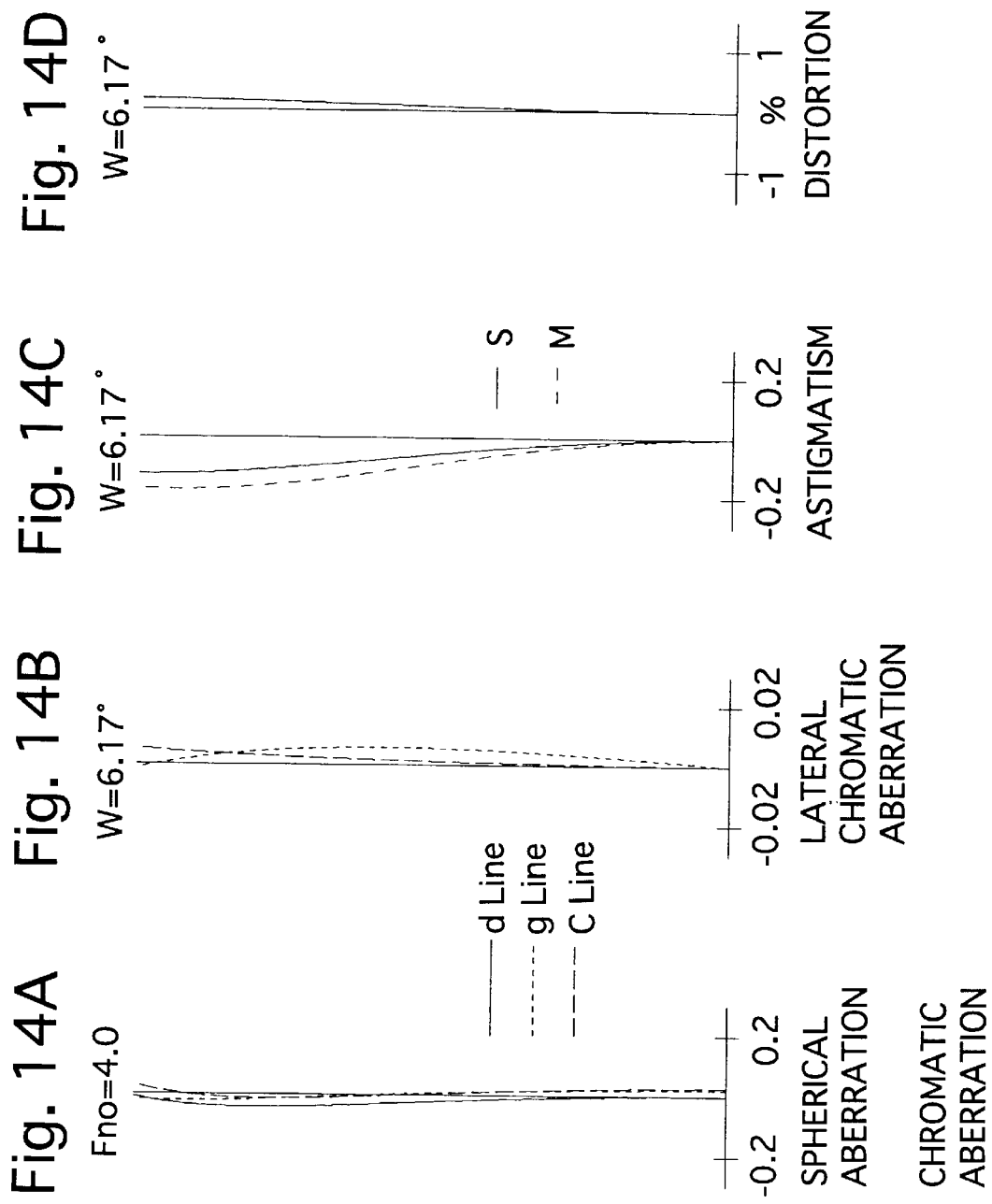

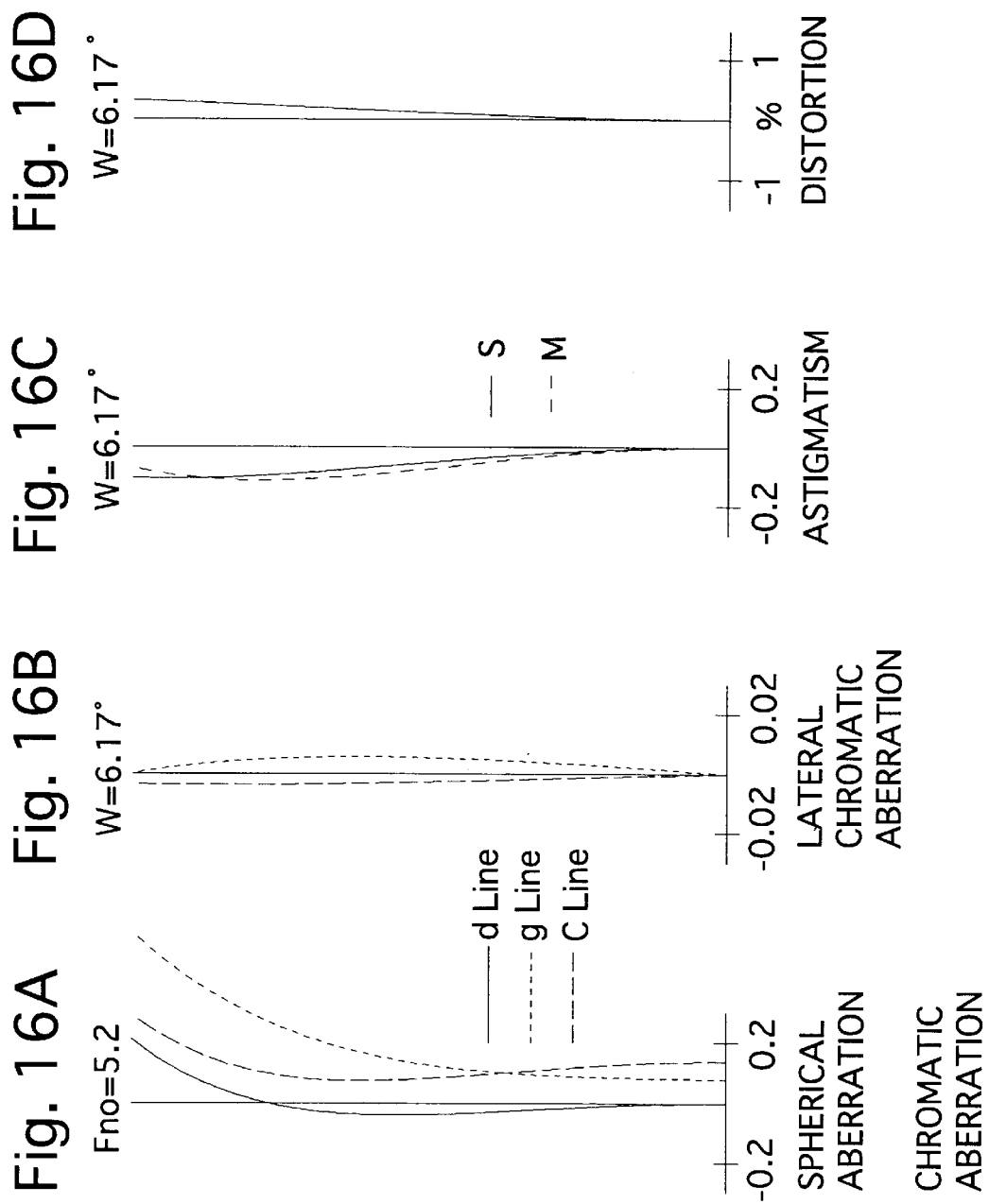

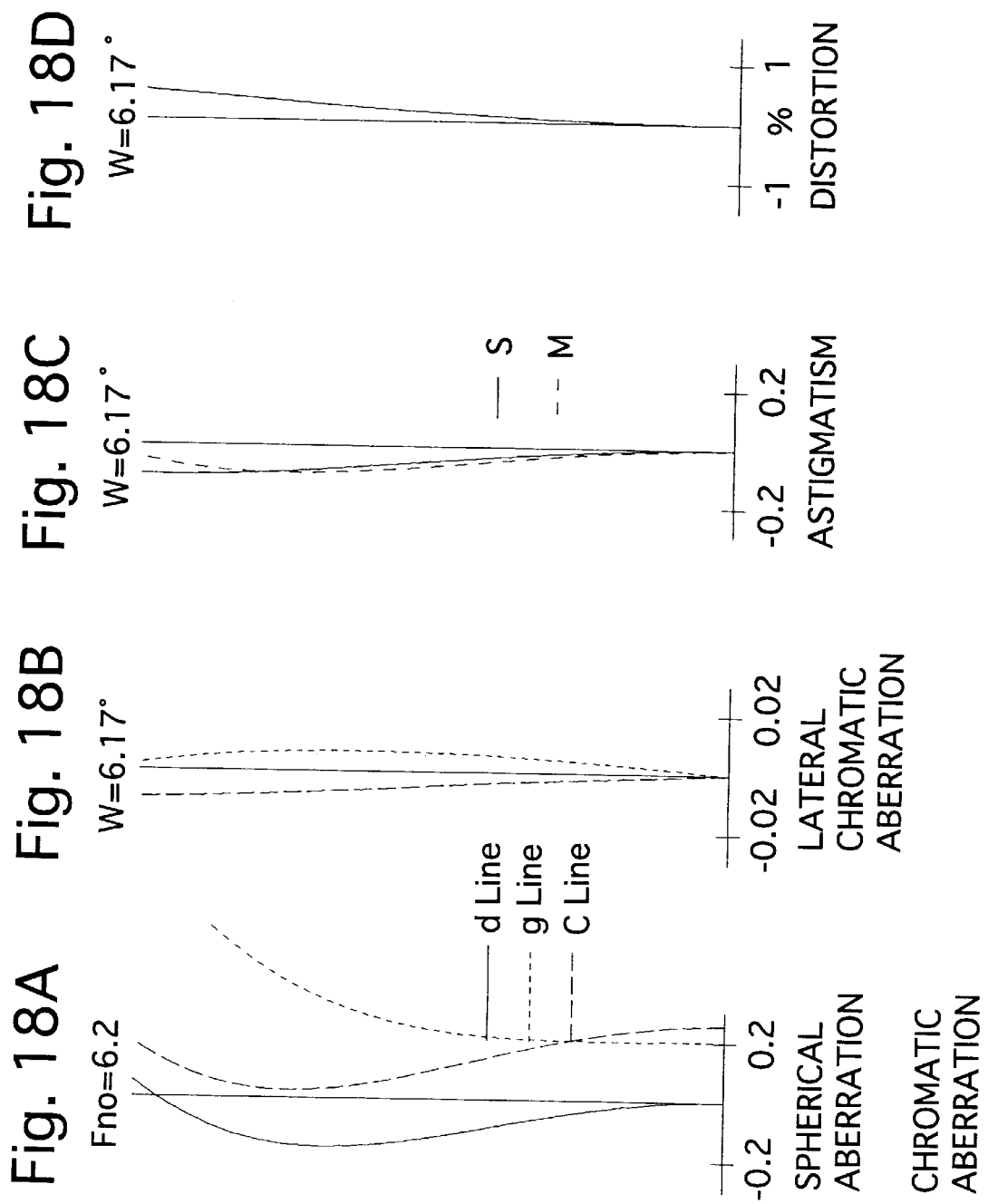

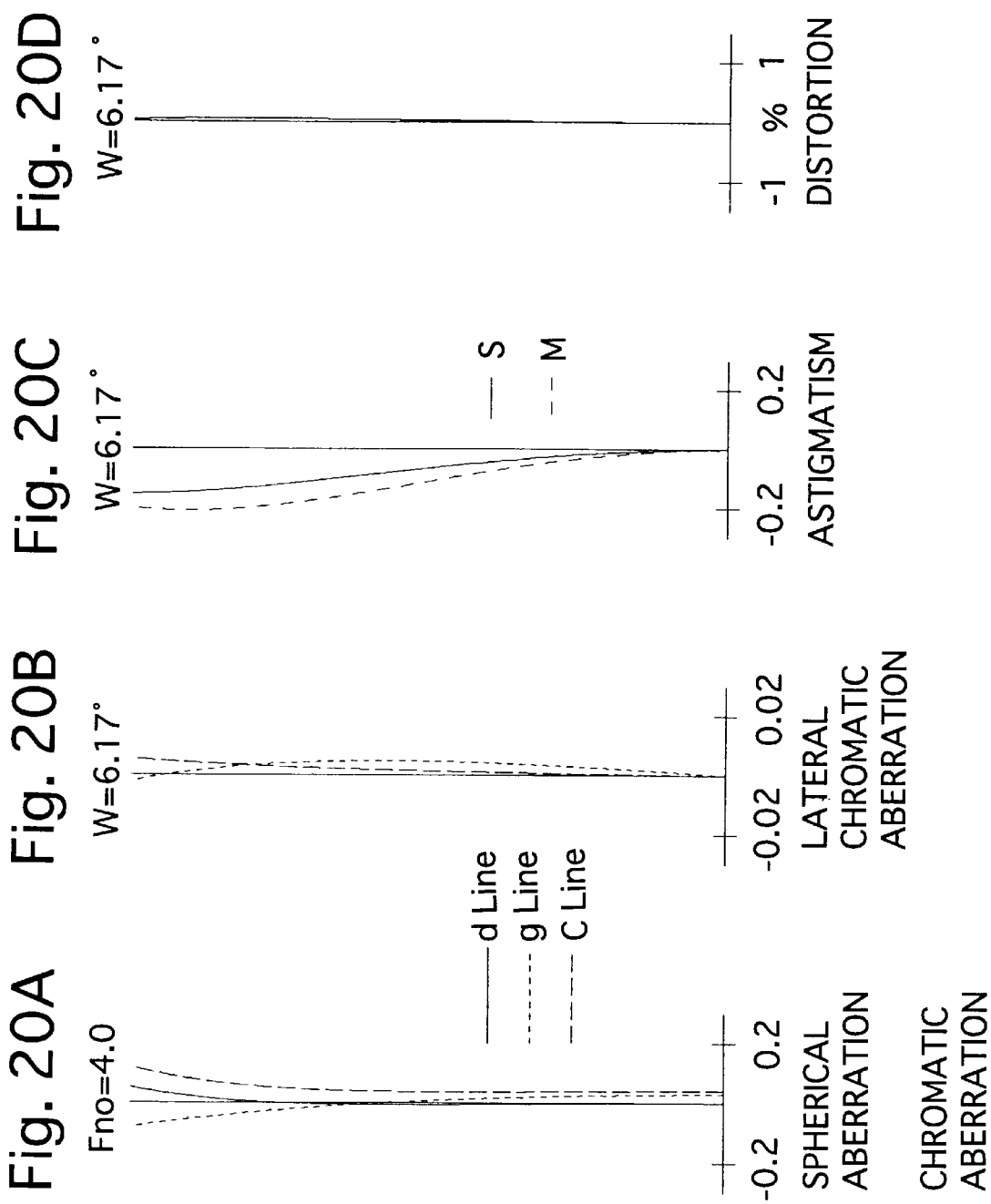

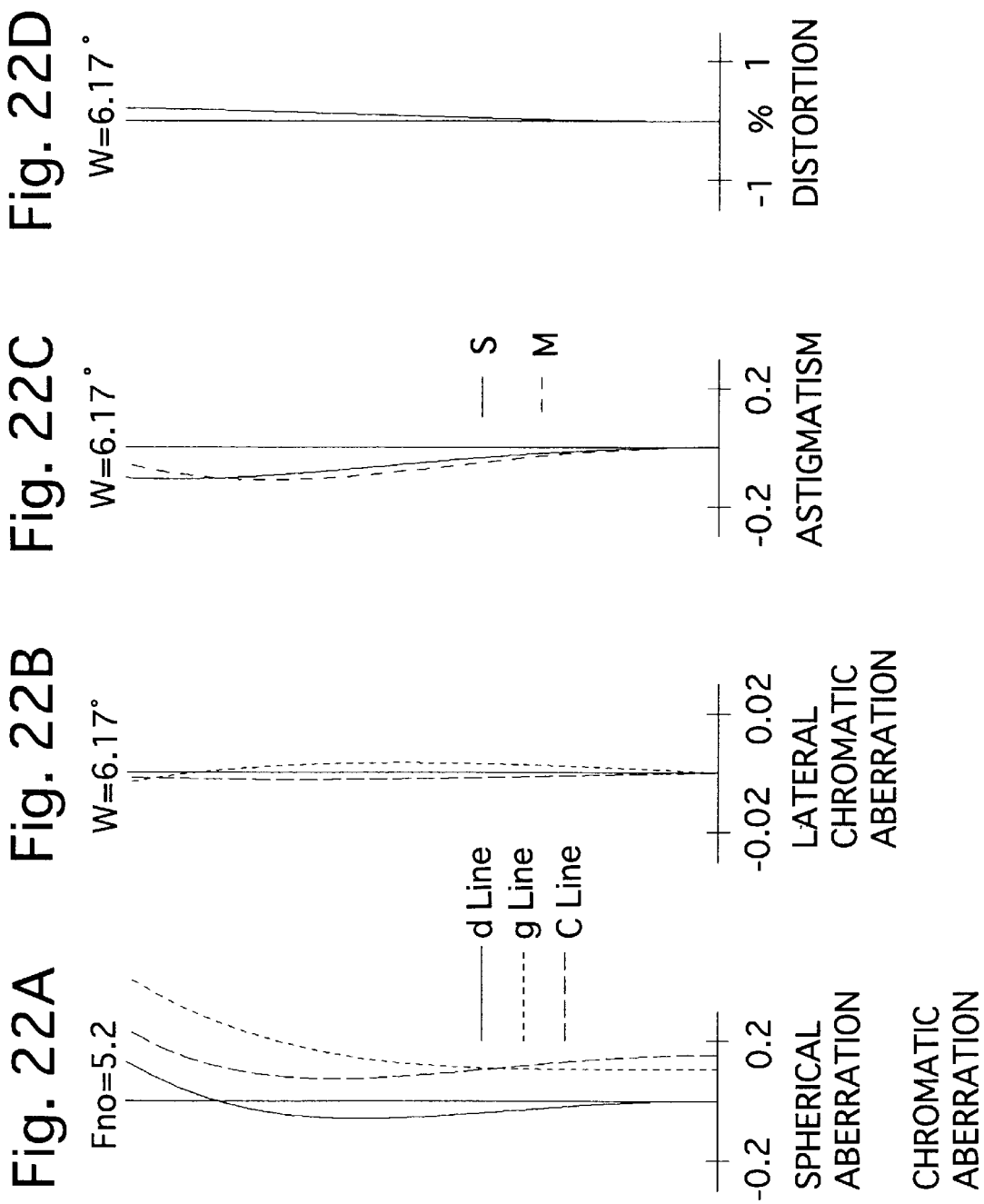

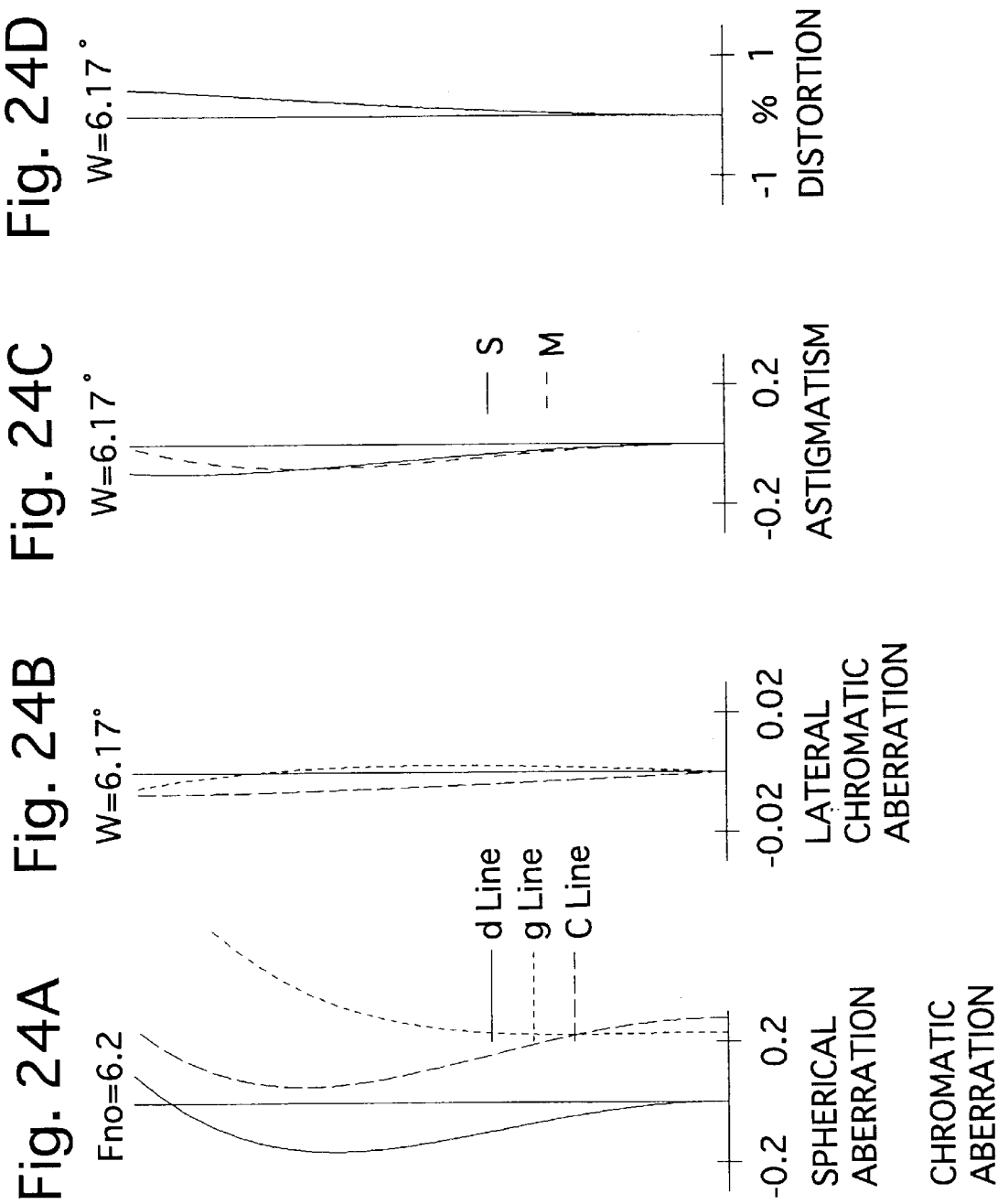

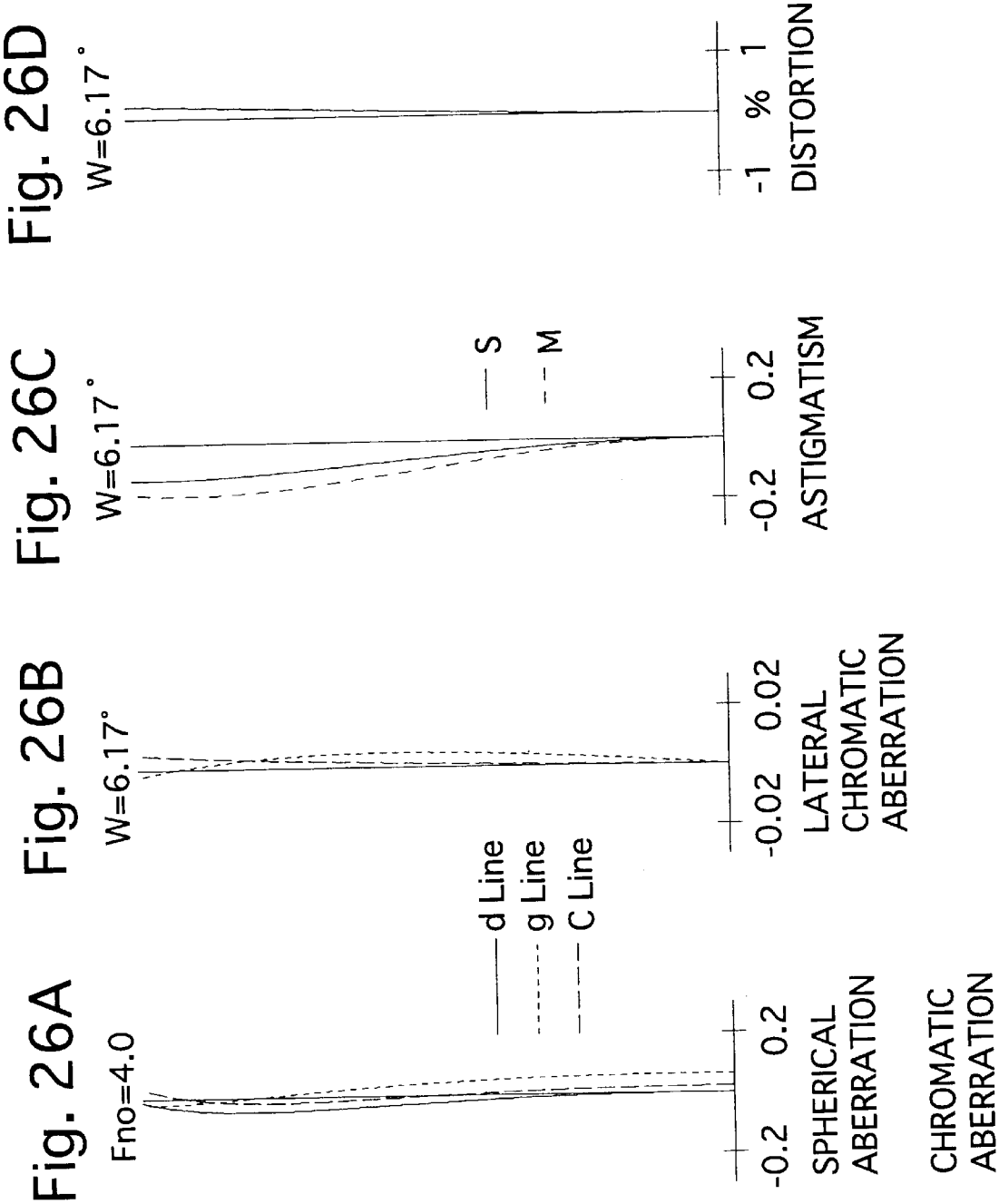

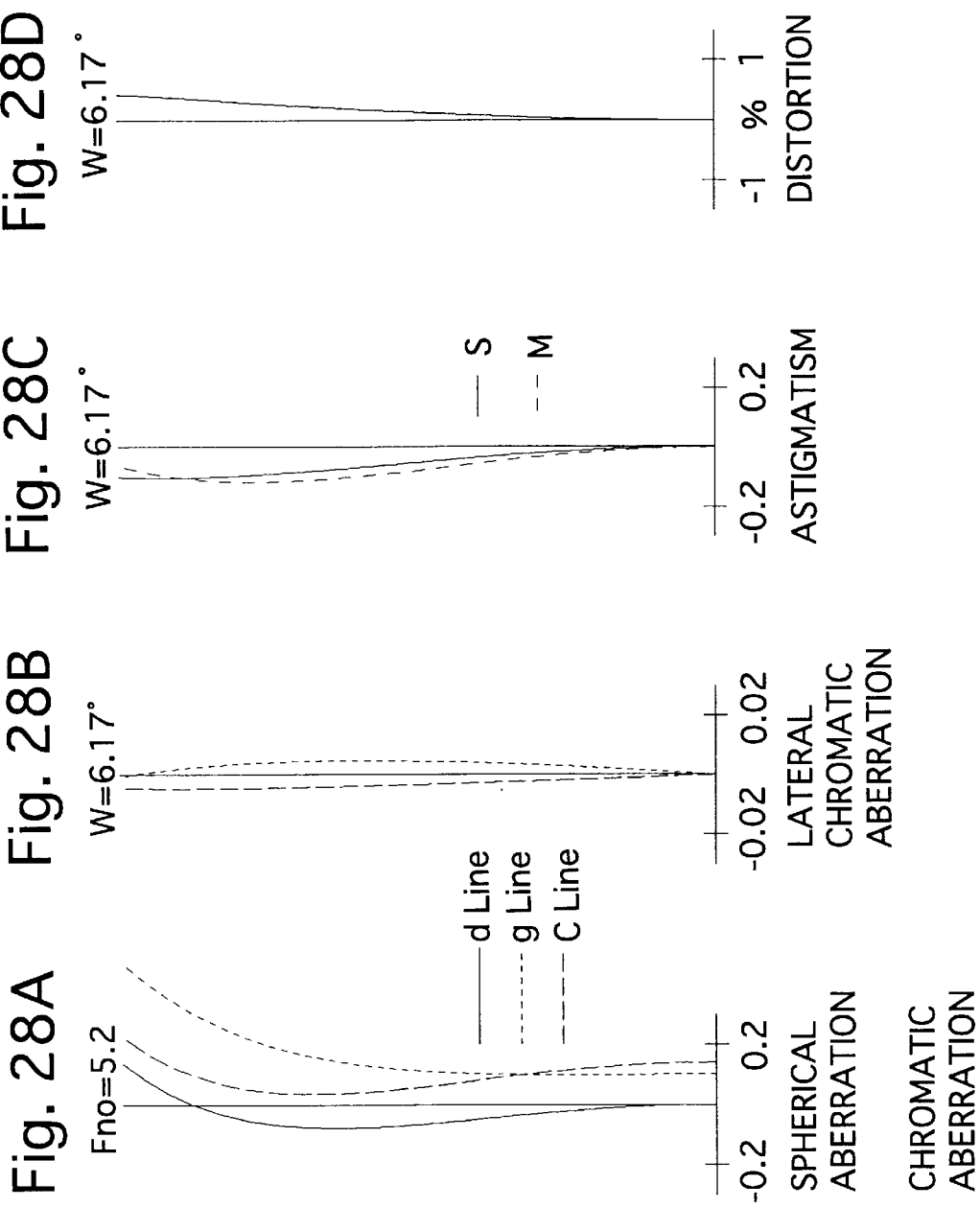

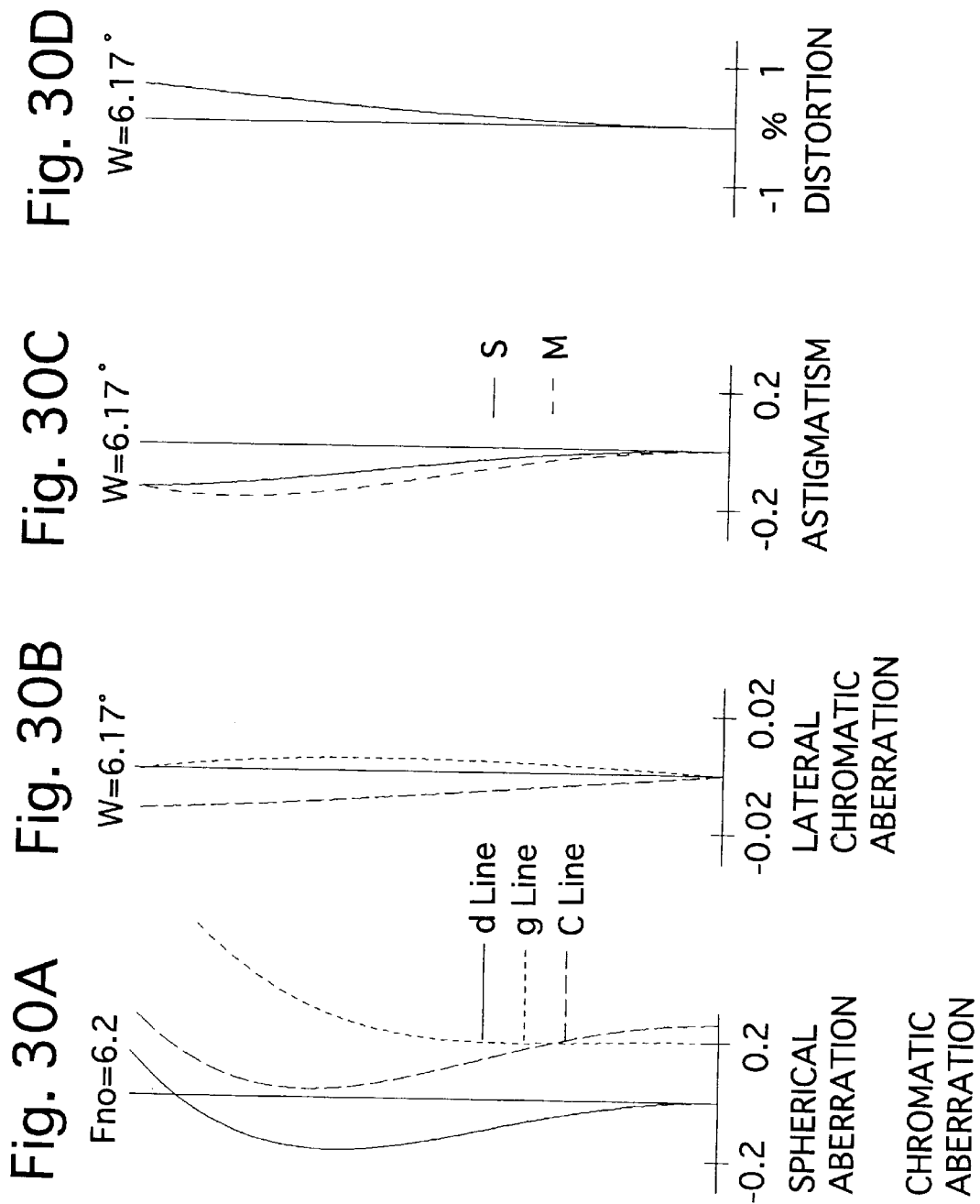

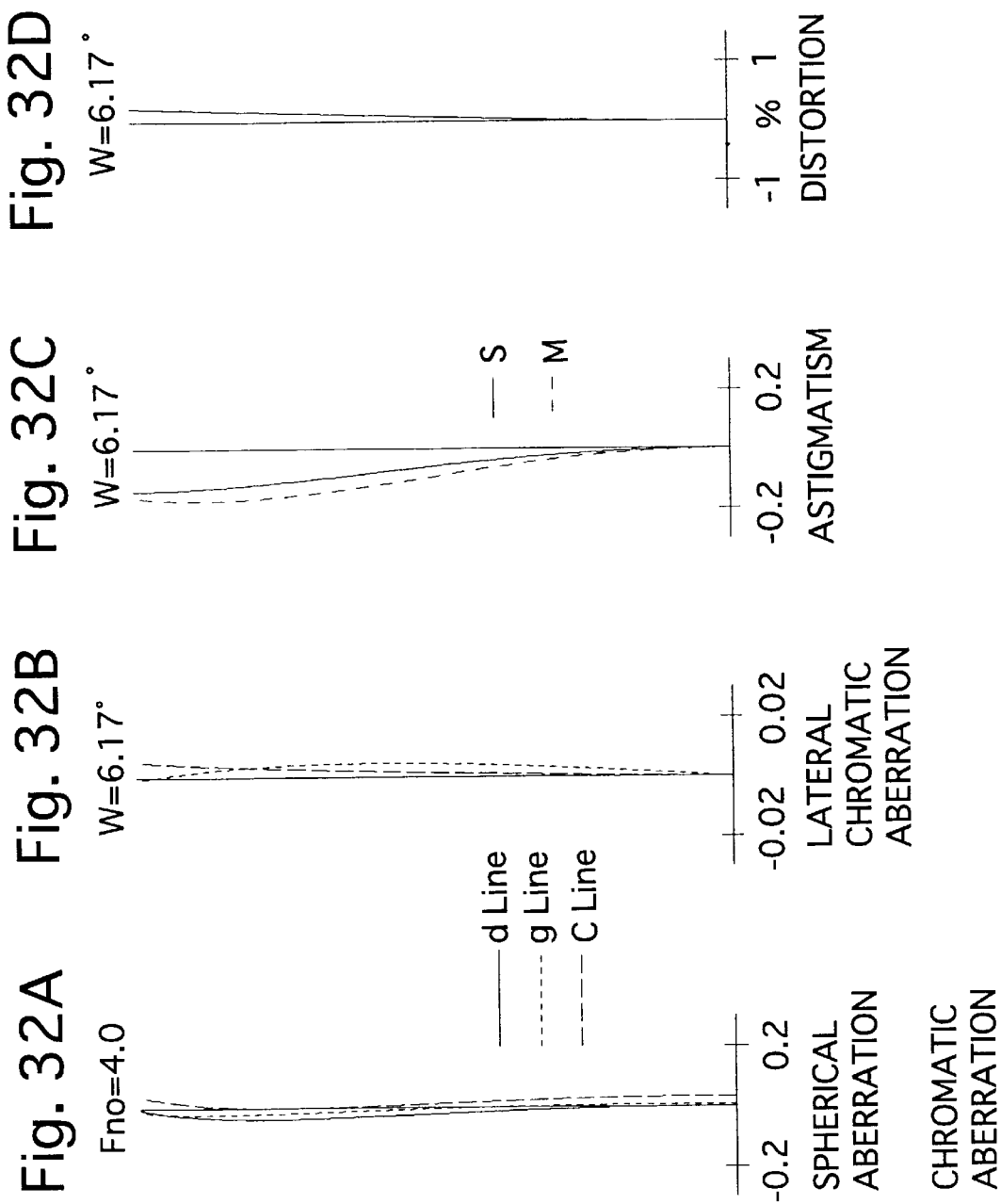

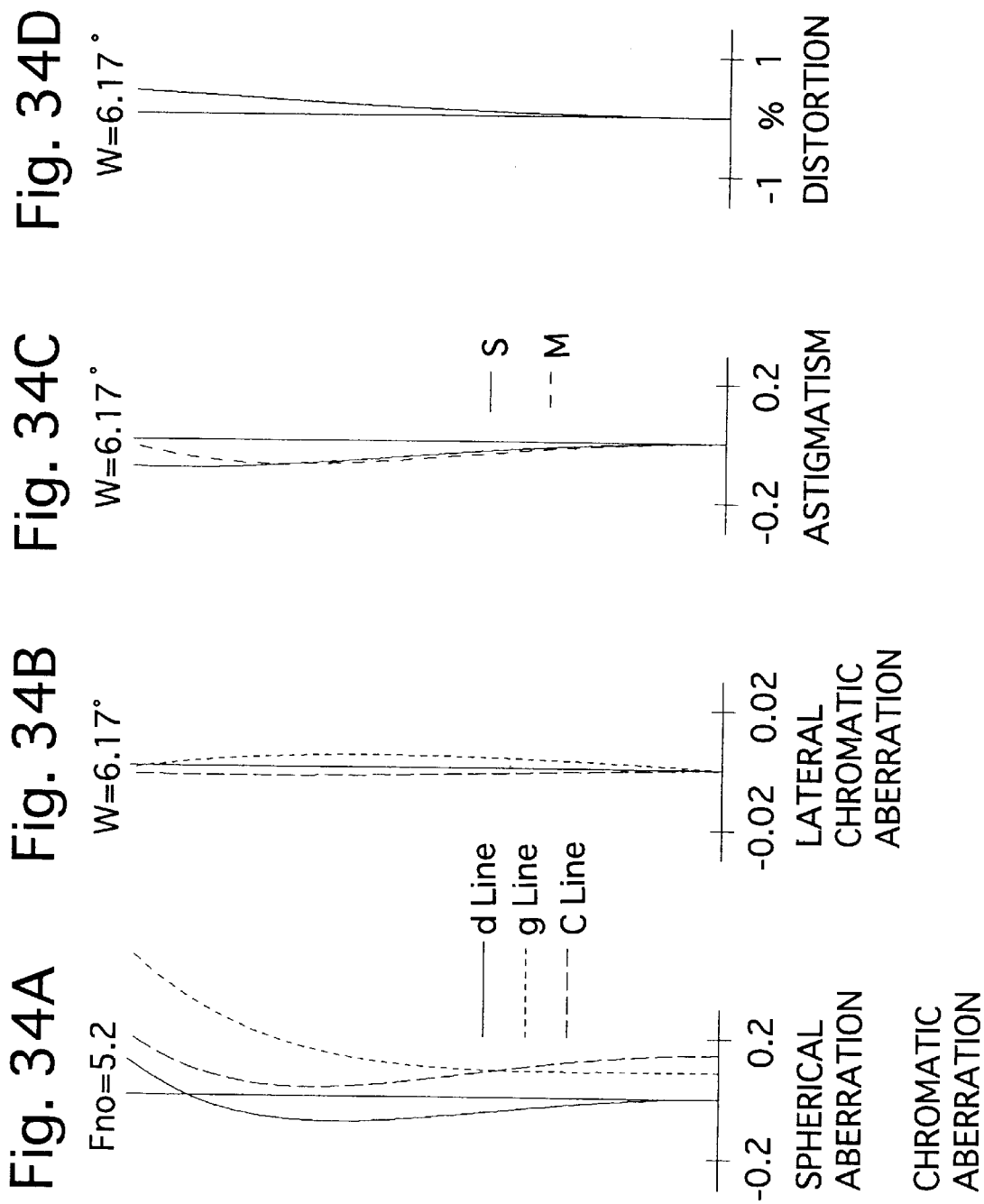

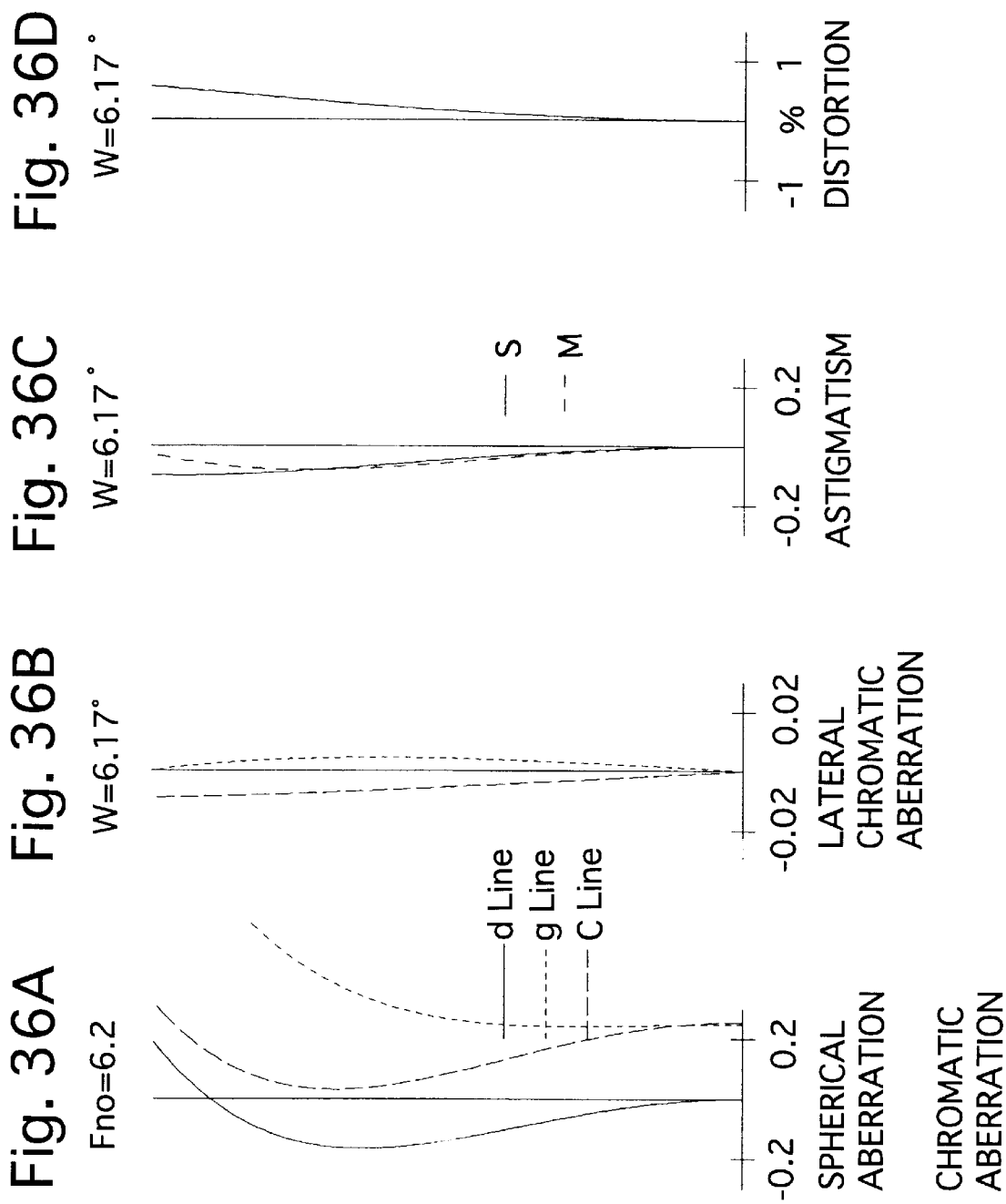

MACRO LENS SYSTEM

BACKGROUND OF THE INVENTION

1. Field of the Invention

The present invention relates to a macro lens system with a long focal length, which enables photographing from infinity to life-size.

2. Description of the Related Art

In a macro lens system, the traveling distance of the focusing lens group is generally long. Moreover, if an attempt is made to provide a longer focal length in a macro lens system, the traveling distance of the focusing lens group tends inevitably to be even longer, and the weight thereof tends inevitably to become heavier. On the other hand, most of the lens systems, not limited to a macro lens system, which are to be used with automatic-focusing equipment, are required to materialize a quick movement of the focusing lens group and an weight-reduction thereof to decrease a load imposed on a power source. However, in the macro lens system disclosed in U.S. Pat. No. 5,402,268, the most object-side lens group is made moveable, and the overall length of the lens system varies accordingly; however, this arrangement is not suitable for an automatic focusing operation, and the optical performance the lens system at an intermediate magnification is not satisfactory.

In addition to the above, the macro lens system disclosed in Japanese Unexamined Patent Publication No. Hei-9-211319 has relatively preferable optical performance; however, the lens system is not suitable for an automatic focusing operation, since the lens diameter is large, the number of lens elements is large, i.e., 14 to 15 lens elements, and the weight thereof is heavier.

SUMMARY OF THE INVENTION

It is an object of the present invention to provide a small-sized and light-weight macro lens system with a long focal length, which enables photographing from infinity (an infinite photographing distance) to life-size (the closest photographing distance), and which is suitable for an automatic-focusing camera and has a high optical performance.

In order to achieve the above objects, there is provided a macro lens system with a long focal length, which includes a positive first lens group, a negative second lens group, a positive third lens group, and a negative fourth lens group, in this order from the object. Upon focusing from an infinite photographing distance to the closest photographing distance, the second lens group moves towards the image, and the third lens group moves toward the object. The macro lens system satisfies the following condition:

$$3.7 < |f \times m / \Delta X3| < 9.9 \quad (1)$$

wherein f designates the focal length of the entire lens system at an infinite photographing distance;

m designates the transverse magnification at the closest photographing distance; and $\Delta X3$ designates the traveling distance of the third lens group from the infinite photographing distance to the closest photographing distance.

The macro lens system preferably satisfies the following condition:

$$0.85 < |\Delta X3 / \Delta X2| < 1.5 \quad (2)$$

wherein $\Delta X2$ designates the traveling distance of the second lens group from the infinite photographing distance to the closest photographing distance.

The macro lens system can be arranged to satisfy the following conditions:

$$0.1 < |\beta 3_E - \beta 3_S| < 0.34 \quad (3)$$

$$\beta 3_E / \beta 3_S < 0 \quad (4)$$

wherein $\beta 3_E$ designates the transverse magnification of the third lens group at the infinite photographing distance; and $\beta 3_S$ designates the transverse magnification of the third lens group at the closest photographing distance.

The macro lens system preferably satisfies the following condition:

$$1.3 < |\beta 4| < 1.8 \quad (5)$$

wherein $\beta 4$ designates the transverse magnification of the fourth lens group.

The present disclosure relates to subject matter contained in Japanese Patent Application No.Hei-11-189213 (filed on Jul. 2, 1999) which is expressly incorporated herein by reference in its entirety.

BRIEF DESCRIPTION OF THE DRAWINGS

The invention will be discussed below in detail with reference to the accompanying drawings, in which:

FIGS. 2A, 2B, 2C and 2D are aberration diagrams of the lens arrangement shown in FIG. 1;

FIGS. 4A, 4B, 4C and 4D are aberration diagrams of the lens arrangement of FIG. 3;

FIGS. 6A, 6B, 6C and 6D are aberration diagrams of the lens arrangement of FIG. 5;

FIGS. 8A, 8B, 8C and 8D are aberration diagrams of the lens arrangement shown in FIG. 7;

FIGS. 10A, 10B, 10C and 10D are aberration diagrams of the lens arrangement of FIG. 9;

FIGS. 12A, 12B, 12C and 12D are aberration diagrams of the lens arrangement of FIG. 11;

FIGS. 14A, 14B, 14C and 14D are aberration diagrams of the lens arrangement shown in FIG. 13;

FIGS. 16A, 16B, 16C and 16D are aberration diagrams of the lens arrangement of FIG. 15;

FIGS. 18A, 18B, 18C and 18D are aberration diagrams of the lens arrangement of FIG. 17;

FIGS. 20A, 20B, 20C and 20D are aberration diagrams of the lens arrangement shown in FIG. 19;

FIGS. 22A, 22B, 22C and 22D are aberration diagrams of the lens arrangement of FIG. 21;

FIGS. 24A, 24B, 24C and 24D are aberration diagrams of the lens arrangement of FIG. 23;

FIGS. 26A, 26B, 26C and 26D are aberration diagrams of the lens arrangement shown in FIG. 25;

FIGS. 28A, 28B, 28C and 28D are aberration diagrams of the lens arrangement of FIG. 27;

FIGS. 30A, 30B, 30C and 30D are aberration diagrams of the lens arrangement of FIG. 29;

FIGS. 32A, 32B, 32C and 32D are aberration diagrams of the lens arrangement shown in FIG. 31;

FIGS. 34A, 34B, 34C and 34D are aberration diagrams of the lens arrangement of FIG. 33;

FIGS. 36A, 36B, 36C and 36D are aberration diagrams of the lens arrangement of FIG. 35.

DESCRIPTION OF THE PREFERRED EMBODIMENTS

Figure 1:
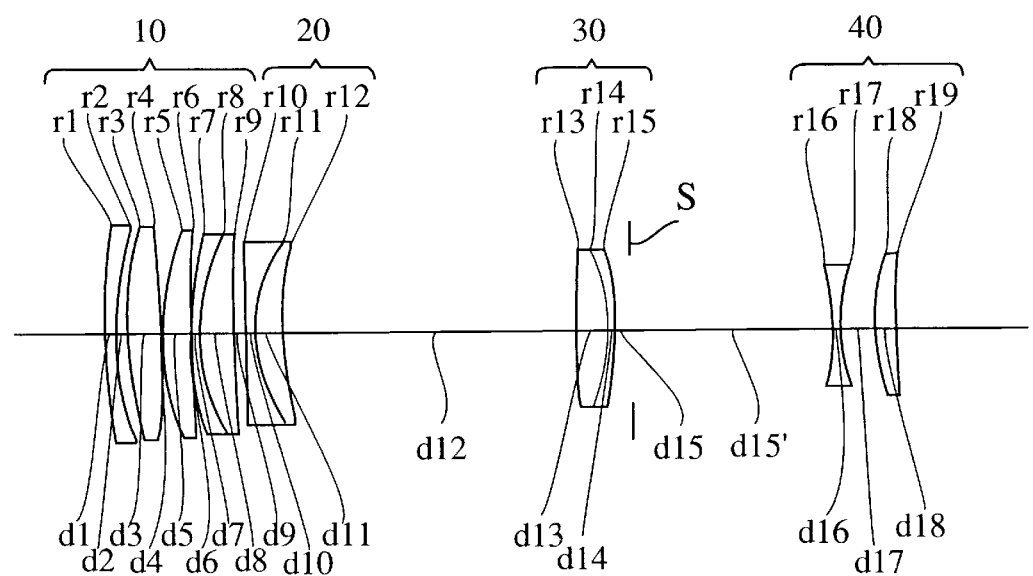
FIG. 1 is a lens arrangement of a first embodiment of a macro lens system with a long focal length, according to the present invention, when the lens system is focused on an object at infinite photographing distance.

The macro lens system with a long focal length, as can be seen in the lens arrangement of each embodiments includes a positive first lens group 10, a negative second lens group 20, a positive third lens group 30, a diaphragm S, and a negative fourth lens group 40, in this order from the object. Upon focusing from an infinite photographing distance to the closest photographing distance, the second lens group 20 moves towards the image, and the third lens group 30 moves towards the object.

The following effects are generally obtained in the case where the second lens group is arranged to move towards the image, and the third lens group is arranged to move towards the object, under the condition that the lens system is constituted by the positive first lens group, the negative second lens group, the positive third lens group and the negative fourth lens group, in this order from the object:

(i) when the negative second lens group moves towards the image, the image plane moves towards the object, since the distance between the positive first lens group and the negative second lens group is made longer; and (ii) when the positive third lens group moves towards the object, the image plane moves towards the object, since the distance between the positive third lens group and the negative fourth lens group is made longer.

These effects are also obtained when the object itself approaches the lens system in the case where the position of the image plane is fixed. In other words, the lens system having the above arrangement has advantages, since the two different ways of moving the lens groups can obtain the same effects. Accordingly, the same effects are shared by the two lens groups, thereby the traveling distance of each lens group can be made shorter.

In the above arrangement of the lens groups, positive spherical aberration and positive curvature of field occur when the negative second lens group moves towards the image; on the other hand, negative spherical aberration and negative curvature of field occur when the positive third lens group moves towards the object. With respect to the movement of the second and third lens groups, spherical aberration and curvature of field occur in the opposite directions, so that spherical aberration and curvature of field are canceled each other. Consequently, the ways of moving the second and third lens groups are also advantageous to correct aberrations.

Condition (1) specifies the traveling distance of the third lens group 30. More concretely, this condition specifies the traveling distance of the third lens group 30 with respect to the advancing distance of (f×m) which is equivalent to the case where the entire lens system is moved for focusing. The larger the value determined by condition (1) is, the shorter the traveling distance, for focusing, of the third lens group 30 to the position corresponding to the closest photographing distance can be.

If $|f \times m/\Delta X3|$ exceeds the lower limit of condition (1), the traveling distance of the third lens group 30 is made longer; as a result, the entire length of the lens system increases, and distortion, at the closest photographing distance, occurs in the positive direction.

If $|f \times m/\Delta X3|$ exceeds the upper limit of condition (1), the traveling distance of the third lens group 30 is made shorter; as a result, the traveling distance of the second lens group 20 increases, and spherical aberration, at the closest photographing distance, is overcorrected.

Condition (2) specifies the ratio of the traveling distance of the second lens group 20 to that of the third lens group 30.

If the traveling distance of the third lens group 30 becomes longer to the extent that $|\Delta X3/\Delta X2|$ exceeds the upper limit of condition (2), fluctuations of aberrations due to the movement of the third lens group 30 becomes large, so that spherical aberration, at the closest photographing distance, is undercorrected.

If the traveling distance of the second lens group 20 becomes longer to the extent that $|\Delta X3/\Delta X2|$ exceeds the lower limit of condition (2), fluctuations of aberrations due to the movement of the second lens group 20 becomes large, so that spherical aberration, at the closest photographing distance, is overcorrected.

Condition (3) specifies the transverse magnification of the third lens group 30. In other words, condition (3) indicates a share of magnification imposed on the third lens group 30 upon focusing.

If the share of magnification imposed on the third lens group 30 upon focusing becomes large to the extent that $|\beta 3_E - \beta 3_S|$ exceeds upper limit of condition (3), spherical aberration, at the closest photographing distance, is under-corrected.

If the share of magnification imposed on the second lens group 20 upon focusing becomes large to the extent that $|\beta 3_E - \beta 3_S|$ exceeds lower limit of condition (3), spherical aberration, at the closest photographing distance, is over-corrected.

Condition (4) is to indicate that in the process of focusing from the infinite photographing distance to the closest photographing distance, a state of a bundle of rays emitted from the second lens group 20 goes through the state of being afocal, in which light rays are parallel. In other words, by satisfying condition (4), in the process of focusing from the infinite photographing distance to the closest photographing distance, a state of the bundle of rays emitted from the second lens group 20, which is arranged to move towards the image upon focusing, varies, from a converging bundle of rays with a narrower bundle width, through the state of being afocal, to a diverging bundle of rays with a wider bundle width. Even if condition (3) is satisfied, unless the bundle of rays emitted from the second lens group 20 is substantially afocal, i.e., if condition (4) is not satisfied, fluctuation of curvature of field upon focusing becomes larger.

If $\beta 3_E/\beta 3_S$ exceeds the upper limit of condition (4), a state of a bundle of rays emitted from the second lens group 20 does not go through the state of being afocal, in the process of focusing from the infinite photographing distance to the closest photographing distance.

Condition (5) specifies the transverse magnification of the fourth lens group 40. Since an enlarging magnification can be obtained by providing the fourth lens group 40 with a negative power, the traveling distance of the third lens group 30 can be reduced.

If $|\beta 4|$ exceeds the upper limit of condition (5), the magnifying ratio becomes too large, and aberrations occurred in the first through third lens groups are intensified.

If $|\beta 4|$ exceeds the lower limit of condition (5), the traveling distance of the third lens group 30 is made longer.

Specific numerical examples will herein be discussed. In the diagrams of chromatic aberration (axial chromatic aberration) represented by spherical aberration, the solid line and the two types of dotted lines respectively indicate spherical aberration with respect to the d, g and C lines. Also, in the diagrams of lateral chromatic aberration, the solid line and the two types of dotted lines respectively indicate magnification with respect to the d, g and C lines. S designates the sagittal image, and M designates the meridional image. In the tables, $F_{NO}$ designates the F-number, f designates the focal length of the entire lens system, W designates the half angle-of-view (°), $f_B$ designates the back focal distance, m designates the transverse magnification, r designates the radius of curvature, d designates the lens thickness or space between lens surfaces, $N_d$ designates the refractive index of the d line, and ν designates the Abbe number.

[Embodiment 1]

Figure 3:
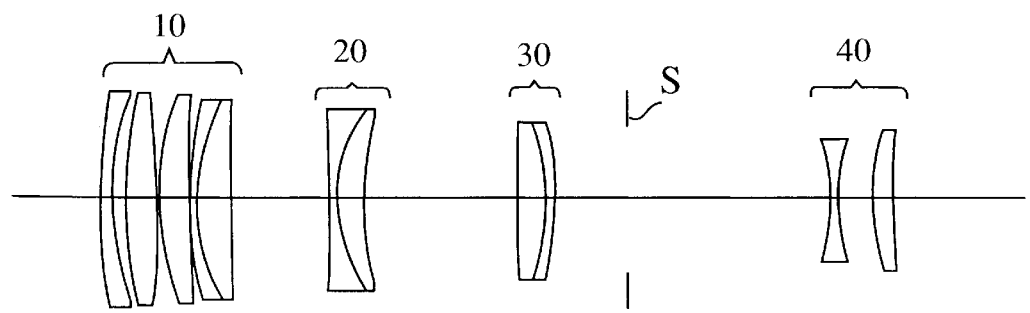
FIG. 3 is the lens arrangement of the first embodiment of the macro lens system at a magnification of −½.
Figure 5:
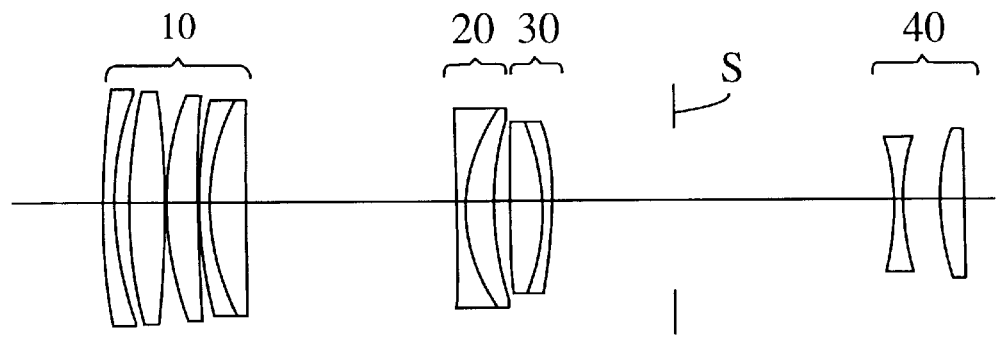
FIG. 5 is the lens arrangement of the first embodiment of the macro lens system at a magnification of −1.

FIGS. 1 through 6 indicate a first embodiment of a macro lens system with a long focal length. FIGS. 1, 3 and 5 show the lens arrangement of the first embodiment, respectively, at an infinite photographing distance, at a magnification of -½, and at a magnification of -1. FIGS. 2A through 2D, FIGS. 4A through 4D, and FIGS. 6A through 6D are aberration diagrams of the lens arrangement respectively shown in FIGS. 1, 3 and 5. Table 1 shows the numerical data thereof. The first lens group 10 includes a negative lens element, a positive lens element, a positive lens element, and a cemented sub-lens group constituted by a negative lens element and a positive lens element, in this order from the object. The second lens group 20 includes a cemented sub-lens group constituted by a negative lens element and a positive lens element. The third lens group 30 includes a cemented sub-lens group constituted by a positive lens element and a negative lens element. The fourth lens group 40 includes a negative lens element and a positive lens element, in this order from the object. A diaphragm S is provided between the third lens group 30 and the fourth lens group 40.

[TABLE 1]

| | Magnification | | |
|---|---|---|---|
| | Infinity | -1/2 | -1 |
| | $F_{No}$ = 1:4.0 | 5.2 | 6.2 |
| | f = 200.00 | | |
| | m = 0.000 | -0.500 | -0.999 |
| | W = 6.17° | 6.17° | 6.17° |
| | $f_B$ = 50.00 | 50.00 | 50.00 |

| Surface No. | r | d | Nd | ν |
|---|---|---|---|---|
| 1 | 146.226 | 2.700 | 1.83400 | 37.2 |
| 2 | 76.810 | 2.700 | — | — |
| 3 | 92.491 | 7.600 | 1.49700 | 81.6 |
| 4 | -240.540 | 0.200 | — | — |
| 5 | 62.855 | 6.777 | 1.49700 | 81.6 |
| 6 | 268.570 | 0.261 | — | — |
| 7 | 88.596 | 2.000 | 1.80400 | 46.6 |
| 8 | 47.819 | 7.543 | 1.48749 | 70.2 |
| 9 | 267.670 | 3.068–23.294–45.763 | — | — |
| 10 | -1110.176 | 1.800 | 1.72916 | 54.7 |
| 11 | 34.802 | 6.461 | 1.69895 | 30.1 |
| 12 | 82.316 | 68.441–35.204–2.906 | — | — |
| 13 | 226.947 | 7.134 | 1.61800 | 63.4 |
| 14 | -50.317 | 2.000 | 1.80518 | 25.4 |
| 15 | -75.854 | 3.772–16.784–26.612 | — | — |
| 15' | Diaphragm | 46.828 | — | — |
| 16 | -56.583 | 2.000 | 1.48749 | 70.2 |
| 17 | 49.665 | 8.074 | — | — |
| 18 | 54.748 | 4.641 | 1.70000 | 48.1 |
| 19 | 153.232 | — | — | — |

[Embodiment 2]

Figure 7:
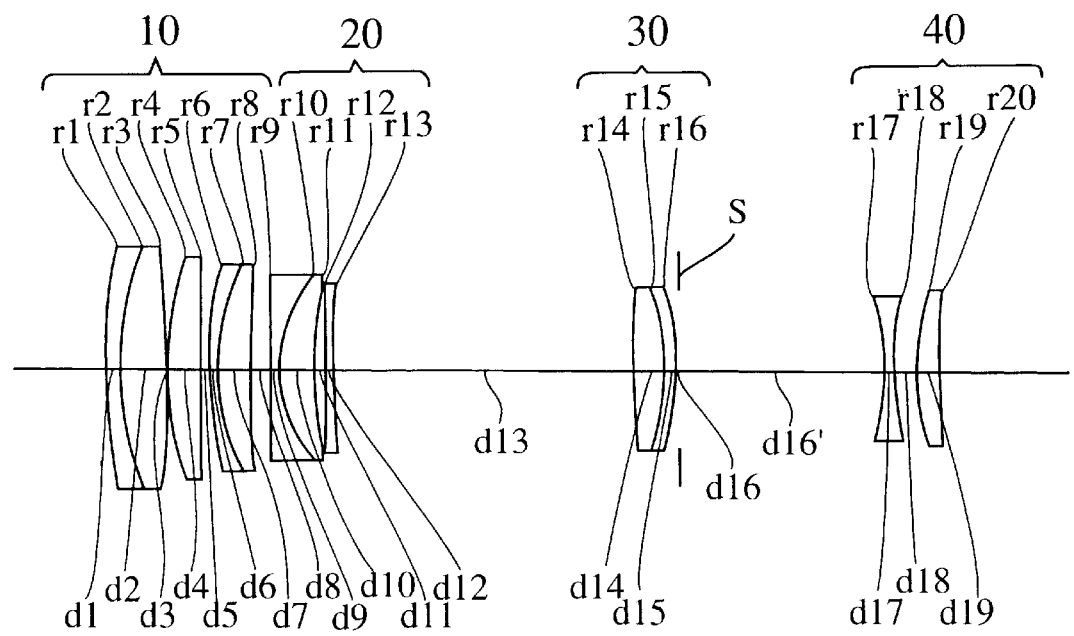
FIG. 7 is a lens arrangement of a second embodiment of a macro lens system with a long focal length, according to the present invention, when the lens system is focused on an object at infinite photographing distance.
Figure 9:
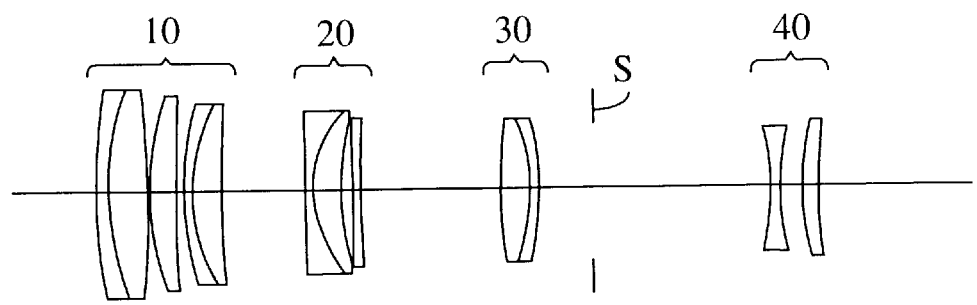
FIG. 9 is the lens arrangement of the second embodiment of the macro lens system at a magnification of −½.
Figure 11:
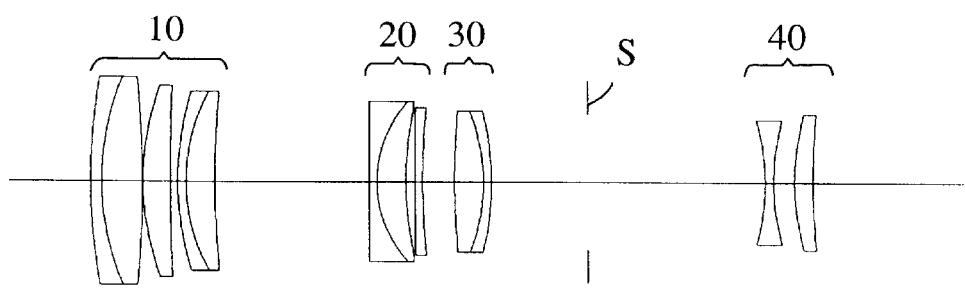
FIG. 11 is the lens arrangement of the second embodiment of the macro lens system at a magnification of −1.

FIGS. 7 through 12 indicate a second embodiment of a macro lens system with a long focal length. FIGS. 7, 9 and 11 show the lens arrangement of the second embodiment, respectively, at an infinite photographing distance, at a magnification of -½, and at a magnification of -1. FIGS. 8A through 8D, FIGS. 10A through 10D, and FIGS. 12A through 12D are aberration diagrams of the lens arrangement respectively shown in FIGS. 7, 9 and 11. Table 2 shows the numerical data thereof. The first lens group 10 includes a cemented sub-lens group constituted by a negative lens element and a positive lens element, a positive lens element, and a cemented sub-lens group constituted by a negative lens element and a positive lens element, in this order from the object. The second lens group 20 includes a cemented sub-lens group constituted by a negative lens element and a positive lens element, and a negative lens element, in this order from the object. The third lens group 30 includes a cemented sub-lens group constituted by a positive lens element and a negative lens element. The fourth lens group 40 includes a negative lens element and a positive lens element, in this order from the object. A diaphragm S is provided between the third lens group 30 and the fourth lens group 40.

[TABLE 2]

| | Magnification | | |
|---|---|---|---|
| Infinity | −1/2 | −1 | |
| $F_{NO}$ = 1:4.0 | 5.2 | 6.2 | |
| f = 200.00 | | | |
| m = 0.000 | −0.500 | −1.001 | |
| W = 6.17° | 6.17° | 6.17° | |
| $f_B$ = 56.00 | 56.00 | 56.00 | |

| Surface No. | r | d | Nd | ν |
|---|---|---|---|---|
| 1 | 146.112 | 2.700 | 1.83400 | 37.2 |
| 2 | 67.586 | 9.982 | 1.49700 | 81.6 |
| 3 | −262.633 | 0.200 | — | — |
| 4 | 69.611 | 6.648 | 1.49700 | 81.6 |
| 5 | 509.578 | 1.840 | — | — |
| 6 | 75.469 | 2.000 | 1.80400 | 46.6 |
| 7 | 46.932 | 7.058 | 1.48749 | 70.2 |
| 8 | 202.872 | 4.496–20.813–38.005 | — | — |
| 9 | −2352.114 | 1.800 | 1.72916 | 54.7 |
| 10 | 29.636 | 7.073 | 1.68893 | 31.1 |
| 11 | 84.237 | 2.244 | — | — |
| 12 | 1431.165 | 1.850 | 1.61800 | 63.4 |
| 13 | 180.186 | 64.137–35.099–7.829 | — | — |
| 14 | 190.485 | 7.118 | 1.61800 | 63.4 |
| 15 | −46.884 | 2.000 | 1.80518 | 25.4 |
| 16 | −71.110 | 1.000–13.721–23.800 | — | — |
| 16' | Diaphragm | 44.069 | — | — |
| 17 | −52.823 | 2.000 | 1.48749 | 70.2 |
| 18 | 56.169 | 5.183 | — | — |
| 19 | 60.449 | 4.601 | 1.77250 | 49.6 |
| 20 | 183.370 | — | — | — |

[Embodiment 3]

Figure 13:
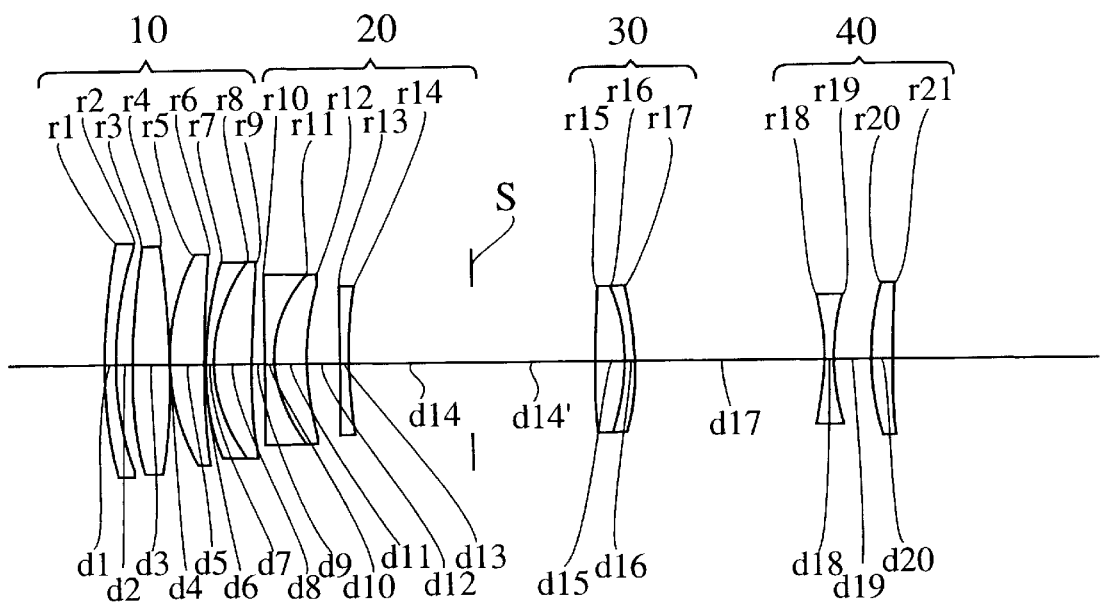
FIG. 13 is a lens arrangement of a third embodiment of a macro lens system with a long focal length, according to the present invention, when the lens system is focused on an object at infinite photographing distance.
Figure 15:
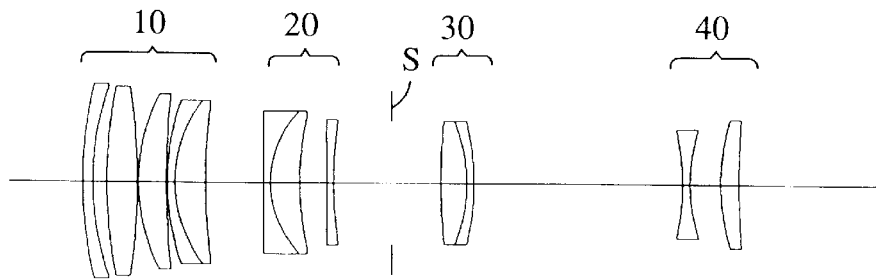
FIG. 15 is the lens arrangement of the third embodiment of the macro lens system at a magnification of –½.
Figure 17:
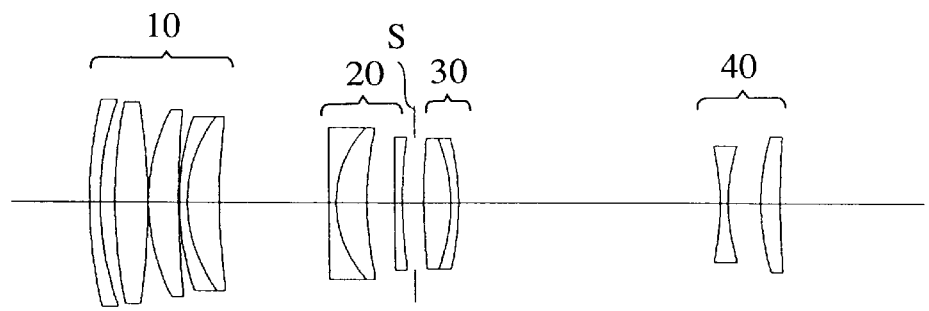
FIG. 17 is the lens arrangement of the third embodiment of the macro lens system at a magnification of –1.

FIGS. 13 through 18 indicate a third embodiment of a macro lens system with a long focal length. FIGS. 13, 15 and 17 show the lens arrangement of the third embodiment, respectively, at an infinite photographing distance, at a magnification of −½, and at a magnification of −1. FIGS. 14A through 14D, FIGS. 16A through 16D, and FIGS. 18A through 18D are aberration diagrams of the lens arrangement respectively shown in FIGS. 13, 15 and 17. Table 3 shows the numerical data thereof. The first lens group 10 includes a negative lens element, a positive lens element, a positive lens element and a cemented sub-lens group constituted by a negative lens element and a positive lens element, in this order from the object. The second lens group 20 includes a cemented sub-lens group constituted by a negative lens element and a positive lens element, and a negative lens element, in this order from the object. The third lens group 30 includes a cemented sub-lens group constituted by a positive lens element and a negative lens element. The fourth lens group 40 includes a negative lens element and a positive lens element, in this order from the object. A diaphragm S is provided between the second lens group 20 and the third lens group 30.

[TABLE 3]

| | Magnification | | |
|---|---|---|---|
| Infinity | −1/2 | −1 | |
| $F_{NO}$ = 1:4.0 | 5.2 | 6.2 | |
| f = 200.00 | | | |
| m = 0.000 | −0.500 | −1.000 | |
| W = 6.17° | 6.17° | 6.17° | |
| $f_B$ = 56.00 | 56.00 | 56.00 | |

[TABLE 3]-continued

| Surface No. | r | d | Nd | ν |
|---|---|---|---|---|
| 1 | 114.886 | 2.700 | 1.80518 | 25.4 |
| 2 | 79.120 | 3.794 | — | — |
| 3 | 133.843 | 8.311 | 1.49700 | 81.6 |
| 4 | −169.077 | 0.200 | — | — |
| 5 | 52.175 | 7.657 | 1.49700 | 81.6 |
| 6 | 258.632 | 0.200 | — | — |
| 7 | 67.982 | 2.000 | 1.80400 | 46.6 |
| 8 | 36.349 | 8.253 | 1.48749 | 70.2 |
| 9 | 154.161 | 3.372–15.751–28.212 | — | — |
| 10 | −2513.264 | 1.800 | 1.72916 | 54.7 |
| 11 | 27.910 | 7.896 | 1.69895 | 30.1 |
| 12 | 79.441 | 7.342 | — | — |
| 13 | −3426.257 | 1.850 | 1.69680 | 55.5 |
| 14 | 125.958 | 27.966–15.586–3.125 | — | — |
| 14' | Diaphragm | 27.464–13.368–2.385 | — | — |
| 15 | 174.832 | 6.979 | 1.61800 | 63.4 |
| 16 | −44.258 | 2.000 | 1.80518 | 25.4 |
| 17 | −68.857 | 42.818–56.915–67.897 | — | — |
| 18 | −63.343 | 2.000 | 1.48749 | 70.2 |
| 19 | 47.859 | 8.402 | — | — |
| 20 | 58.797 | 4.994 | 1.77250 | 49.6 |
| 21 | 250.501 | — | — | — |

[Embodiment 4]

Figure 19:
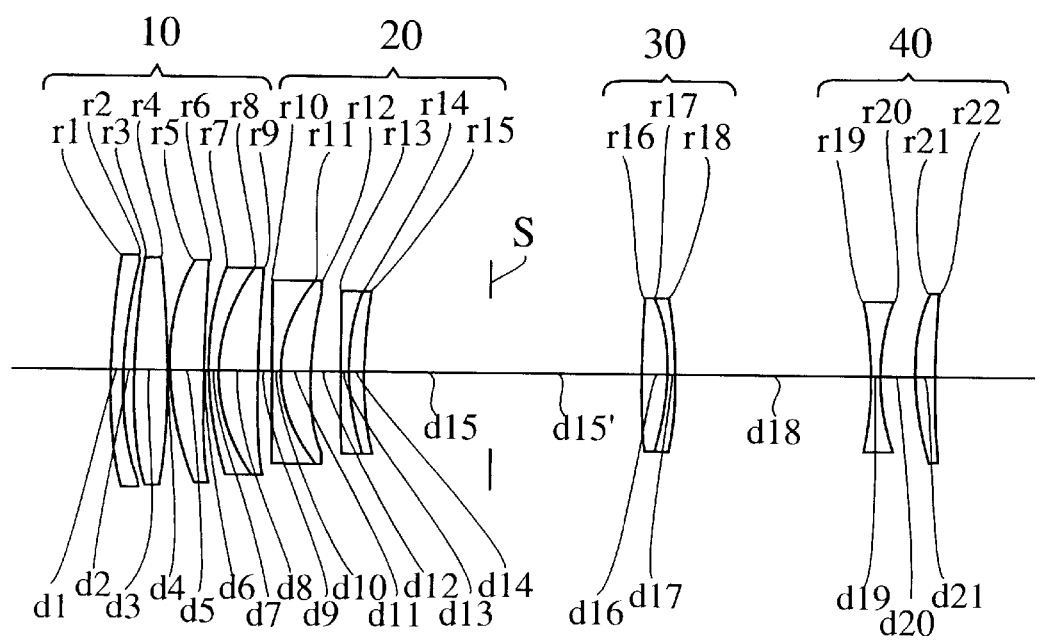
FIG. 19 is a lens arrangement of a fourth embodiment of a macro lens system with a long focal length, according to the present invention, when the lens system is focused on an object at infinite photographing distance.
Figure 21:
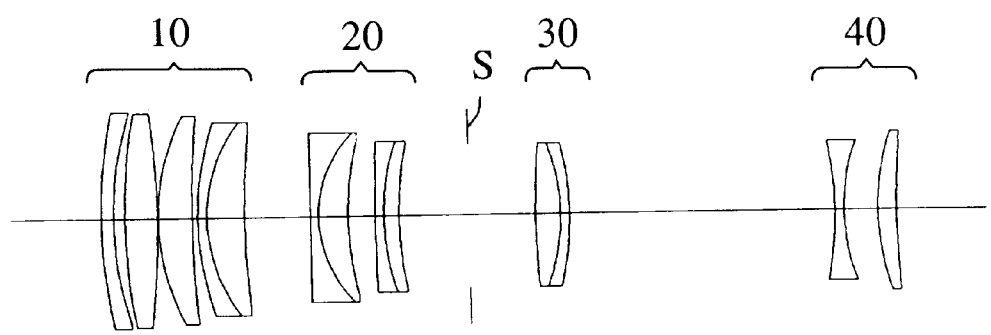
FIG. 21 is the lens arrangement of the fourth embodiment of the macro lens system at a magnification of –½.
Figure 23:
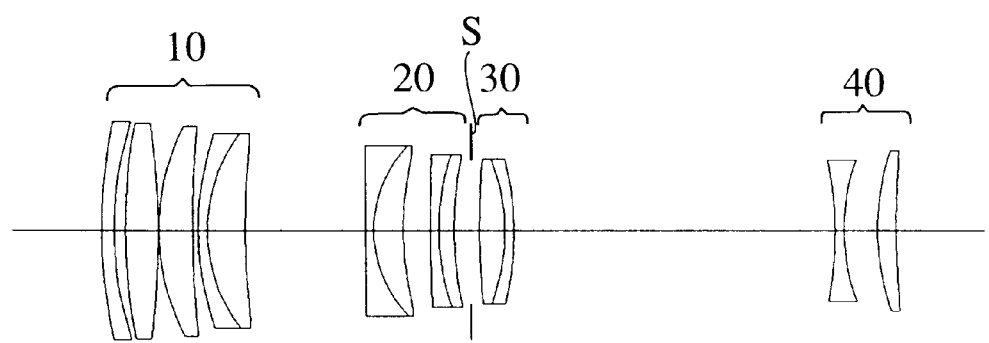
FIG. 23 is the lens arrangement of the fourth embodiment of the macro lens system at a magnification of –1.

FIGS. 19 through 24 indicate a fourth embodiment of a macro lens system with a long focal length. FIGS. 19, 21 and 23 show the lens arrangement of the fourth embodiment, respectively, at an infinite photographing distance, at a magnification of −½, and at a magnification of −1. FIGS. 20A through 20D, FIGS. 22A through 22D, and FIGS. 24A through 24D are aberration diagrams of the lens arrangement respectively shown in FIGS. 19, 21 and 23. Table 4 shows the numerical data thereof. The first lens group 10 includes a negative lens element, a positive lens element, a positive lens element and a cemented sub-lens group constituted by a negative lens element and a positive lens element, in this order from the object. The second lens group 20 includes a cemented sub-lens group constituted by a negative lens element and a positive lens element, and a cemented sub-lens group constituted by a negative lens element and a positive lens element, in this order from the object. The third lens group 30 includes a cemented sub-lens group constituted by a positive lens element and a negative lens element. The fourth lens group 40 includes a negative lens element and a positive lens element, in this order from the object. A diaphragm S is provided between the second lens group 20 and the third lens group 30.

[TABLE 4]

| | Magnification | | |
|---|---|---|---|
| Infinity | −1/2 | −1 | |
| $F_{NO}$ = 1:4.0 | 5.2 | 6.2 | |
| f = 200.00 | | | |
| m = 0/000 | −0.502 | −1.002 | |
| W = 6.17° | 6.17° | 6.17° | |
| $f_B$ = 56.00 | 56.00 | 56.00 | |

| Surface No. | r | d | Nd | ν |
|---|---|---|---|---|
| 1 | 114.994 | 2.700 | 1.80518 | 25.4 |
| 2 | 79.149 | 2.518 | — | — |
| 3 | 130.717 | 7.239 | 1.49700 | 81.6 |
| 4 | −185.468 | 0.200 | — | — |
| 5 | 52.544 | 7.470 | 1.49700 | 81.6 |
| 6 | 231.373 | 1.266 | — | — |
| 7 | 67.906 | 2.000 | 1.80400 | 46.6 |
| 8 | 36.597 | 8.371 | 1.48749 | 70.2 |

[TABLE 4]-continued

| | | | | |
|---|---|---|---|---|
| 9 | 191.300 | 3.035–14.619–26.601 | — | — |
| 10 | −38277.155 | 1.800 | 1.77250 | 49.6 |
| 11 | 27.656 | 6.628 | 1.76585 | 30.2 |
| 12 | 73.548 | 6.069 | — | — |
| 13 | 527.645 | 1.850 | 1.61800 | 63.4 |
| 14 | 52.746 | 3.430 | 1.80400 | 46.6 |
| 15 | 82.099 | 27.159–15.575–3.593 | — | — |
| 15' | Diaphragm | 32.465–14.841–2.035 | — | — |
| 16 | 177.326 | 5.578 | 1.61800 | 63.4 |
| 17 | −46.080 | 2.000 | 1.80518 | 25.4 |
| 18 | −73.030 | 41.856–59.480–72.286 | — | — |
| 19 | −77.380 | 2.000 | 1.48749 | 70.2 |
| 20 | 46.004 | 7.530 | — | — |
| 21 | 55.507 | 4.184 | 1.77250 | 49.6 |
| 22 | 196.105 | — | — | — |

[Embodiment 5]

Figure 25:
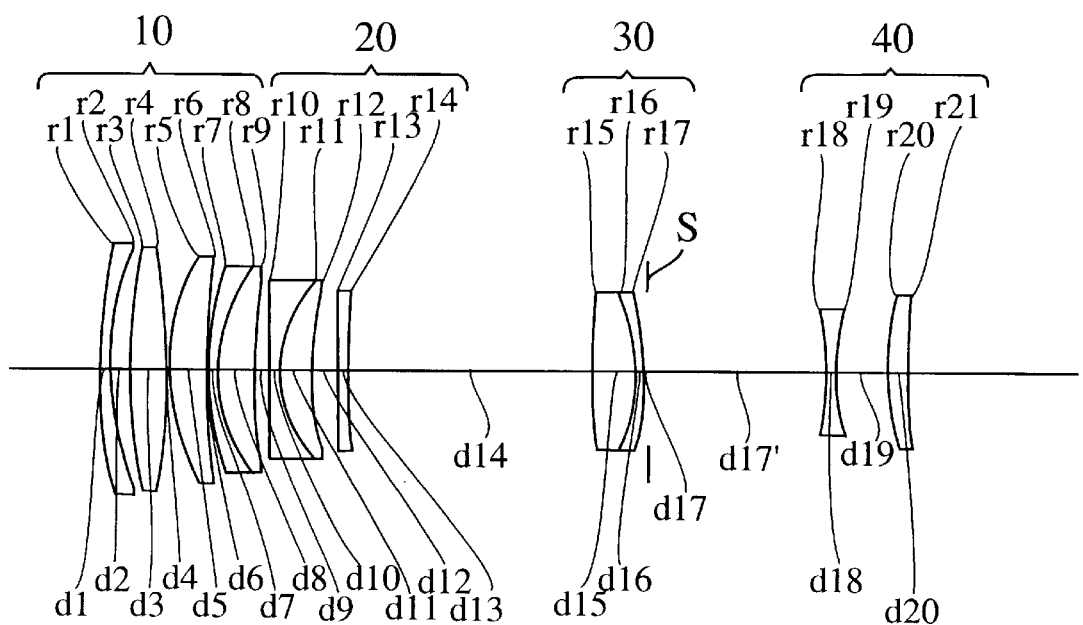
FIG. 25 is a lens arrangement of a fifth embodiment of a macro lens system with a long focal length, according to the present invention, when the lens system is focused on an object at infinite photographing distance.
Figure 27:
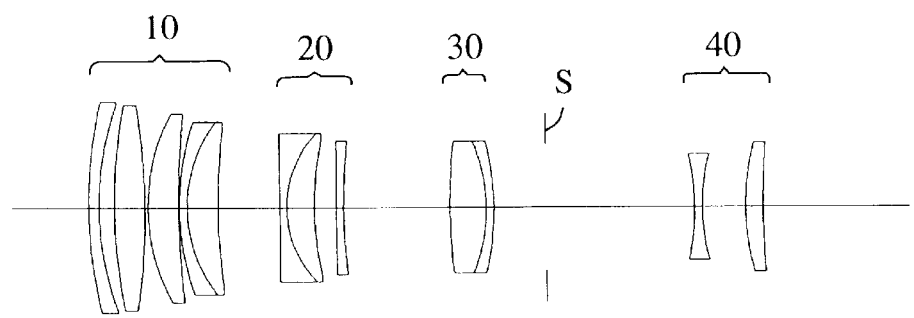
FIG. 27 is the lens arrangement of the fifth embodiment of the macro lens system at a magnification of –½.
Figure 29:
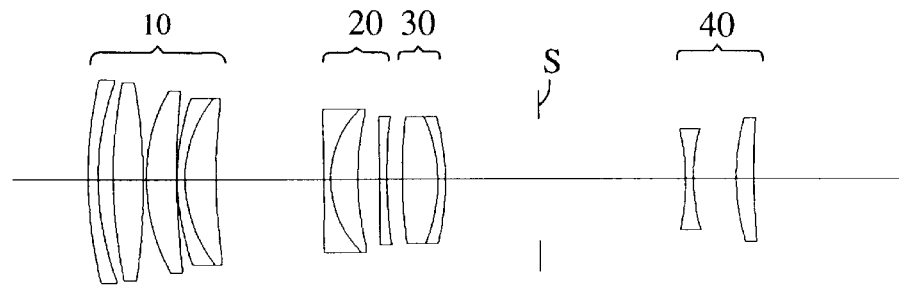
FIG. 29 is the lens arrangement of the fifth embodiment of the macro lens system at a magnification of –1.

FIGS. 25 through 30 indicate a fifth embodiment of a macro lens system with a long focal length. FIGS. 25, 27 and 29 show the lens arrangement of the fifth embodiment, respectively, at an infinite photographing distance, at a magnification of −½, and at a magnification of −1. FIGS. 26A through 26D, FIGS. 28A through 28D, and FIGS. 30A through 30D are aberration diagrams of the lens arrangement respectively shown in FIGS. 25, 27 and 29. Table 5 shows the numerical data thereof. The basic lens arrangement is the same as that of the third embodiment. A diaphragm S is provided between the third lens group 30 and the fourth lens group 40.

[TABLE 5]

| | Magnification | | |
|---|---|---|---|
| | Infinity | −1/2 | −1 |
| $F_{NO}$ = 1:4.0 | | 5.2 | 6.2 |
| f = 200.00 | | | |
| m = 0.000 | | −0.500 | −1.000 |
| W = 6.17° | | 6.17° | 6.17° |
| $f_B$ = 57.28 | | 57.28 | 57.28 |

| Surface No. | r | d | Nd | ν |
|---|---|---|---|---|
| 1 | 114.509 | 2.700 | 1.80518 | 25.4 |
| 2 | 79.018 | 3.997 | — | — |
| 3 | 134.784 | 7.988 | 1.49700 | 81.6 |
| 4 | −170.737 | 0.750 | — | — |
| 5 | 52.210 | 7.976 | 1.49700 | 81.6 |
| 6 | 233.456 | 0.200 | — | — |
| 7 | 68.399 | 2.000 | 1.80400 | 46.6 |
| 8 | 36.527 | 8.132 | 1.48749 | 70.2 |
| 9 | 155.309 | 3.418–16.270–28.670 | — | — |
| 10 | −1529.582 | 1.800 | 1.72916 | 54.7 |
| 11 | 27.642 | 7.228 | 1.69895 | 30.1 |
| 12 | 78.554 | 5.794 | — | — |
| 13 | 11433.261 | 1.850 | 1.69680 | 55.5 |
| 14 | 139.989 | 53.409–27.808–4.140 | — | — |
| 15 | 145.763 | 9.404 | 1.61800 | 63.4 |
| 16 | −44.203 | 2.000 | 1.80518 | 25.4 |
| 17 | −69.546 | 1.000–13.749–25.017 | — | — |
| 17' | Diaphragm | 38.984 | — | — |
| 18 | −62.328 | 2.00 | 1.48749 | 70.2 |
| 19 | 48.808 | 11.428 | — | — |
| 20 | 62.621 | 4.661 | 1.77250 | 49.6 |
| 21 | 230.400 | — | — | — |

[Embodiment 6]

Figure 31:
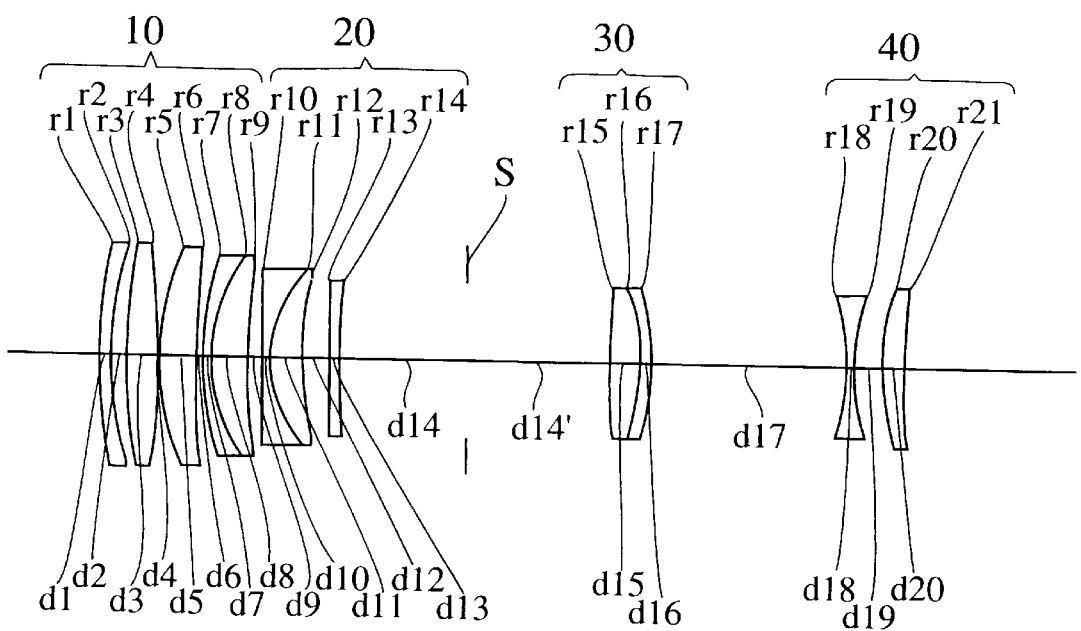
FIG. 31 is a lens arrangement of a sixth embodiment of a macro lens system with a long focal length, according to the present invention, when the lens system is focused on an object at infinite photographing distance.
Figure 33:
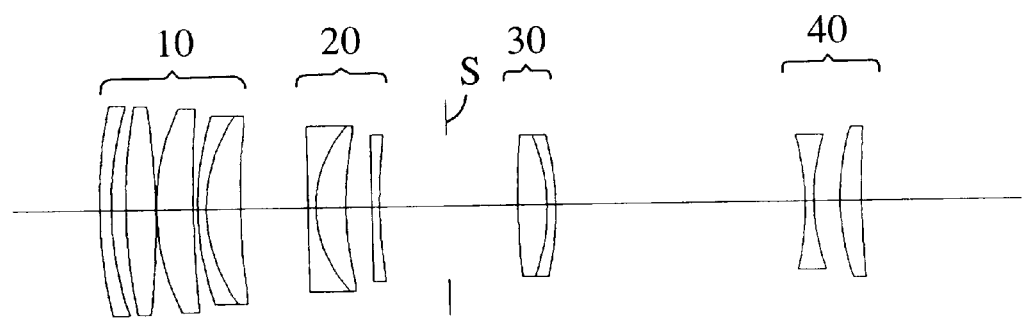
FIG. 33 is the lens arrangement of the sixth embodiment of the macro lens system at a magnification of –½.
Figure 35:
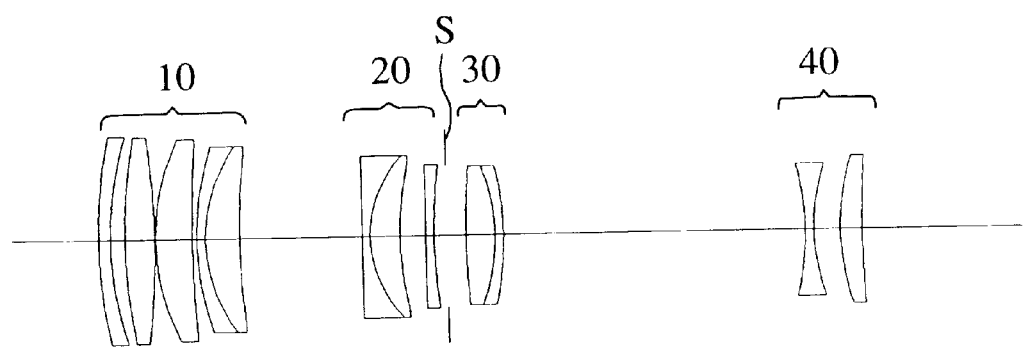
FIG. 35 is the lens arrangement of the sixth embodiment of the macro lens system at a magnification of –1.

FIGS. 31 through 36 indicate a sixth embodiment of a macro lens system with a long focal length. FIGS. 31, 33 and 35 show the lens arrangement of the sixth embodiment, respectively, at an infinite photographing distance, at a magnification of −½, and at a magnification of −1. FIGS. 32A through 32D, FIGS. 34A through 34D, and FIGS. 36A through 36D are aberration diagrams of the lens arrangement respectively shown in FIGS. 31, 33 and 35. Table 6 shows the numerical data thereof. The basic lens arrangement is the same as that of the third embodiment. A diaphragm S is provided between the second lens group 20 and the third lens group 30.

[TABLE 6]

| | Magnification | | |
|---|---|---|---|
| | Infinity | −1/2 | −1 |
| $F_{NO}$ = 1:4.0 | | 5.2 | 6.2 |
| f = 200.00 | | | |
| m = 0.000 | | −0.500 | −1.000 |
| W = 6.17° | | 6.17° | 6.17° |
| $f_B$ = 56.00 | | 56.00 | 56.00 |

| Surface No. | r | d | Nd | ν |
|---|---|---|---|---|
| 1 | 119.065 | 2.700 | 1.80518 | 25.4 |
| 2 | 80.223 | 3.369 | — | — |
| 3 | 126.928 | 6.947 | 1.49700 | 81.6 |
| 4 | −185.824 | 0.200 | — | — |
| 5 | 54.523 | 8.482 | 1.49700 | 81.6 |
| 6 | 274.186 | 1.050 | — | — |
| 7 | 68.448 | 2.000 | 1.80400 | 46.6 |
| 8 | 37.381 | 8.028 | 1.48749 | 70.2 |
| 9 | 165.467 | 3.181–15.812–28.553 | — | — |
| 10 | 24014.139 | 1.800 | 1.72916 | 54.7 |
| 11 | 28.103 | 6.988 | 1.69895 | 30.1 |
| 12 | 79.572 | 5.994 | — | — |
| 13 | −7721.338 | 1.850 | 1.69680 | 55.5 |
| 14 | 125.921 | 28.400–15.768–3.028 | — | — |
| 14' | Diaphragm | 31.498–16.367–4.434 | — | — |
| 15 | 184.520 | 6.786 | 1.61800 | 63.4 |
| 16 | −45.365 | 2.000 | 1.80518 | 25.4 |
| 17 | −70.230 | 43.453–58.584–70.516 | — | — |
| 18 | −62.541 | 2.000 | 1.48749 | 70.2 |
| 19 | 47.917 | 6.174 | — | — |
| 20 | 57.233 | 5.099 | 1.77250 | 49.6 |
| 21 | 238.302 | — | — | — |

The numerical values of each condition of each embodiment are shown in Table 7.

[TABLE 7]

| | Cond.(1) | Cond.(2) | Cond.(3) | Cond.(4) | Cond.(5) |
|---|---|---|---|---|---|
| Embod.(1) | 8.76 | 0.54 | 0.22 | −2.67 | 1.62 |
| Embod.(2) | 8.77 | 0.68 | 0.24 | −0.71 | 1.60 |
| Embod.(3) | 7.97 | 1.01 | 0.27 | −0.29 | 1.52 |
| Embod.(4) | 6.57 | 1.29 | 0.32 | −0.48 | 1.46 |
| Embod.(5) | 8.33 | 0.95 | 0.27 | −0.23 | 1.63 |
| Embod.(6) | 7.39 | 1.07 | 0.29 | −0.38 | 1.50 |

Except the first and second embodiments, each embodiment satisfies each condition, and aberrations are relatively well corrected.

According to the above description, a small-sized and light-weight macro lens system with a long focal length, which enables photographing from infinity to life-size, and which is suitable for an automatic-focusing camera and has a high optical performance, can be obtained.

What is claimed is:

1. A macro lens system comprising a positive first lens group, a negative second lens group, a positive third lens group, and a negative fourth lens group, in this order from an object;

wherein upon focusing from an infinite photographing distance to the closest photographing distance, said second lens group moves towards an image, said third lens group moves toward said object, and said fourth lens group remains stationary; and wherein said macro lens system satisfies the following condition:

$$3.7<|f\times m/\Delta X3|<9.9$$

wherein f designates the focal length of the entire lens system at an infinite photographing distance;

m designates the transverse magnification at the closest photographing distance; and $\Delta X3$ designates the traveling distance of said third lens group from said infinite photographing distance to the closest photographing distance.

2. The macro lens system according to claim 1, further satisfies the following condition:

$$0.85<|\Delta X3/\Delta X2|<1.5$$

wherein $\Delta X2$ designates the traveling distance of said second lens group from said infinite photographing distance to the closest photographing distance.

3. The macro lens system according to claim 2, further satisfies the following conditions:

$$0.1<|\beta 3_E-\beta 3_S|<0.34$$

$$\beta 3_E/\beta 3_S<0$$

wherein $\beta 3_E$ designates the transverse magnification of said third lens group at said infinite photographing distance; and $\beta 3_S$ designates the transverse magnification of said third lens group at the closest photographing distance.

4. The macro lens system according to claim 3, further satisfies the following condition:

$$1.3<|\beta 4|<1.8$$

wherein $\beta 4$ designates the transverse magnification of said fourth lens group.

\* \* \* \* \*